(12) United States Patent
Coppola et al.

(10) Patent No.: US 11,409,127 B1
(45) Date of Patent: Aug. 9, 2022

(54) FOLDING FRAME FOR EYEGLASSES

(71) Applicants: Roman F Coppola, Los Angeles, CA (US); Nathan H Nebeker, Salt Lake City, UT (US)

(72) Inventors: Roman F Coppola, Los Angeles, CA (US); Nathan H Nebeker, Salt Lake City, UT (US)

( * ) Notice: Subject to any disclaimer, the term of this patent is extended or adjusted under 35 U.S.C. 154(b) by 372 days.

(21) Appl. No.: 16/583,077

(22) Filed: Sep. 25, 2019

(51) Int. Cl.
*G02C 5/00* (2006.01)
*G02C 5/08* (2006.01)

(52) U.S. Cl.
CPC .............. *G02C 5/006* (2013.01); *G02C 5/08* (2013.01); *G02C 2200/02* (2013.01)

(58) Field of Classification Search
CPC ...... G02C 5/006; G02C 5/08; G02C 2200/02; G02C 5/001; G02C 5/12; G02C 5/14; G02C 5/16; G02C 5/20; G02C 5/22; G02C 5/143; G02C 5/229; G02C 5/2209; G02C 5/2254; G02C 5/2263; G02C 5/2272; G02C 1/00; G02C 1/02; G02C 9/00; G02C 3/003; G02C 3/04
See application file for complete search history.

(56) References Cited

U.S. PATENT DOCUMENTS

| | | | |
|---|---|---|---|
| 2,975,426 A | 3/1961 | Rabb | |
| 4,720,186 A | 1/1988 | Douillard | |
| 5,028,126 A | 7/1991 | Takeuchi | |
| 5,448,317 A | 9/1995 | Huang | |
| 5,576,776 A | 11/1996 | Scheller | |
| 6,017,119 A | 1/2000 | Huang | |
| 7,905,591 B2 | 3/2011 | Strobel | |
| 8,857,980 B2 | 10/2014 | Wang et al. | |
| 9,010,927 B2 | 4/2015 | Rubin | |
| 9,310,623 B2 | 4/2016 | Porter | |
| 9,645,409 B2 | 5/2017 | Lundh | |
| 9,726,900 B1 | 8/2017 | Holzer et al. | |
| 2006/0290881 A1 | 12/2006 | Yu | |
| 2009/0190088 A1* | 7/2009 | Strobel | G02C 5/006 351/63 |
| 2010/0073625 A1 | 3/2010 | Engstrom | |
| 2014/0268011 A1 | 9/2014 | Larmer et al. | |

(Continued)

FOREIGN PATENT DOCUMENTS

WO WO 2016/092204 6/2016

*Primary Examiner* — Mustak Choudhury
(74) *Attorney, Agent, or Firm* — Brian C. Trask

(57) ABSTRACT

A folding frame for eyeglasses, the frame being structured to fold into a W-shape and thereby, dispose a frame front left half in parallel with a frame front right half, both left and right halves being disposed between respective left and right temple pieces. A first catch holds the left and right halves in parallel at a stored configuration, and a second catch holds the temple pieces in parallel at the stored configuration. An enlarged grip area is sometimes provided in at least one temple piece to facilitate one-handed orienting of the fully-deployed frame in registration on a user's head. Certain embodiments are configured to permit a user to cause a one-handed release and subsequent automatic frame deployment from a stored configuration to a first configuration wherein the frame front left and right halves are disposed in a common plane, and the temple pieces are disposed normal to that plane.

20 Claims, 31 Drawing Sheets

(56) References Cited

U.S. PATENT DOCUMENTS

2014/0368784 A1\* 12/2014 Rubin ................... G02C 5/006
                                                        351/63
2014/0375946 A1\* 12/2014 Rochford ................ G02C 5/14
                                                        351/63
2016/0004092 A1    1/2016 Lando
2016/0327807 A1   11/2016 Iten
2018/0129067 A1    5/2018 Boedecker et al.
2018/0129078 A1\*  5/2018 Blum ................... G02C 11/00

\* cited by examiner

FOLDING FRAME FOR EYEGLASSES

BACKGROUND

Field of the Invention

This invention relates to frames for eyeglasses. It is particularly directed to a spring-biased frame with a bridge that folds 180 degrees to dispose left and right lenses in parallel and disposed between parallel temple pieces at a stored 'W' frame configuration, and sometimes may subsequently be both deployed from the stored configuration to a conventional use configuration and installed on a user's head by using only a single hand in a one-hand operation.

State of the Art

Eyeglasses to provide vision correction and/or to reduce glare are well known, and are often made reference to as "eyewear" in this disclosure. Conventional eyewear includes a pair of lenses that are held in a folding frame. The frame generally includes a pair of hinged left and right temple pieces that are configured to support the bridge area of a fixed frame front on a user's nose. The frame front is typically fixed, in that it does not fold, bend, or substantially move, at the bridge area. Left and right lenses remain in parallel, both at a wearable configuration, and at a storage configuration. The temple pieces are affixed at opposite left and right sides of the frame front, and are conventionally rotated about respective hinges from a deployed, or wearable, configuration to a storage configuration at which the temple pieces would be substantially in parallel with the fixed frame front.

Many variations in eyewear frames have been developed in attempts to improve functionality in various ways. United States patent application No. 2010/0073625 discloses eyewear optimized for compact storage. U.S. Pat. No. 7,905,591 solves the storage problem by converting a multi-folded pair of glasses to a jewelry necklace. U.S. Pat. No. 4,720,186 discloses a frame that may fold for storage in association with a wristwatch band. United States patent application No. 2010/00073625 discloses a flexible bridge for compact storage of a Pince-nez type of glasses.

United States patent application No. 2016/0327807 discloses a mechanical linkage to permit one-handed deployment from, or retraction to, a stored configuration. Eyewear including magnetic elements structured for coupling a second set of lenses is disclosed in United States patent application No. 2006/0290881.

United States patent documents that disclose folding eyewear frames that include magnetic elements disposed to maintain frame elements in a deployed and wearable (and/or sometimes stored) configuration include U.S. Pat. Nos. 8,857,980; 9,010,927; 9,310,623; 9,645,409; and 9,726,900; and United States patent application Nos. 2014/0268011; 2016/0004092; and 2018/0129067. Published International patent application No. WO 2016/092204 discloses stacked bipolar disk magnets that are associated with a hinge system for eyewear in place of springs.

United States patents that disclose frames for eyewear structured to fold into a "W" shape, with the lenses disposed variously between the temple pieces at the stored configuration include: U.S. Pat. Nos. 6,017,119; 5,448,317; 5,028,126; and 2,975,426. U.S. Pat. No. 5,576,776 discloses eyewear frames with temple pieces that fold to dispose lenses on opposite sides of the temple pieces.

Certain of the aforementioned documents disclose temple pieces that are configured for even more compact storage by way of telescopic or hinged mechanisms included in the temple pieces.

Deploying known eyewear from a storage configuration to a use configuration and installing the eyewear onto a user generally requires the use of two hands. It would be an improvement to provide novel eyewear that may be folded to occupy a conveniently reduced storage volume. It is further desirable that the eyewear may subsequently be deployed and installed with a one-hand operation, wherein the deployment phase desirably provides a user experience that is "smooth". Another improvement would be to provide folding eyewear with a temple grip area configured to enhance control over rotation of the deployed eyewear about a temple piece length axis to facilitate one-hand orientation of the eyewear during its installation onto a user.

BRIEF SUMMARY OF THE INVENTION

This invention provides a folding frame for eyeglasses. The frame includes a front and a pair of temple pieces. The frame front includes a left half to hold a left optical lens and a right half to hold a right optical lens. A first hinge is disposed in a bridge connecting the left half to the right half. The first hinge is configured to permit folding the frame front from a deployed configuration to a stored configuration resembling a W, such that the left half rotates by about 180 degrees with respect to the right half to dispose the front surface of the left half and the front surface of the right half adjacent to one another with the left half and the right half disposed in parallel at the stored configuration. The first hinge may include a first pivot axis and a second pivot axis, the first pivot axis being disposed approximately in parallel with, and spaced apart from, the second pivot axis. A workable first hinge may alternatively include only a single pivot axis.

A left temple piece extends between a front end and a rear end, the rear end of the left temple piece being configured for association with the left side of a user's head when the apparatus is deployed and disposed at an installed position on the user's head. A second hinge is associated with the front end of the left temple piece to pivotally connect the left temple piece to the left half. A right temple piece extends between a front end and a rear end, the rear end of the right temple piece being configured for association with the right side of the user's head at the installed position. A third hinge is associated with the front end of the right temple piece to pivotally connect the right temple piece to the right half.

A plurality of biasing elements are configured and arranged to urge motion of the frame from the stored configuration toward a first configuration. A workable biasing element includes a coil torsion spring. Biasing elements advantageously may be biased upon assembly of a frame. The plurality of biasing elements may include a first spring biased to urge rotation of the left front frame half, by about 90 degrees about the first pivot axis, from the stored configuration toward the first configuration. Another biasing element may be embodied as a second spring that is biased to urge rotation of the right frame front half, by about 90 degrees about the second pivot axis, from the stored configuration toward the first configuration. Additional biasing elements may include a third spring and a fourth spring. The third spring can be biased to urge relative rotation of the left temple piece with respect to the left half, by about 90 degrees about a pivot axis of the second hinge element, from the stored configuration toward the first configuration. Similarly, the fourth spring can be biased to urge relative rotation of the right temple piece with respect to the right half, by about 90 degrees about a pivot axis of the third hinge, from the stored configuration toward the first configuration.

The frame includes a first catch configured to releaseably hold the frame front left half in a fixed parallel association with respect to the frame front right half at the stored configuration, and a second catch configured to releaseably hold the left temple piece in a fixed parallel association with the right temple piece at the stored configuration. A workable first catch may include a pair of magnets disposed to associate cooperating opposite poles for contact together at the stored configuration. Similarly, a workable second catch may include a first magnet carried by the left temple piece at a location spaced apart from the front end of the left temple piece, and a second magnet carried by the right temple piece at a location spaced apart from the front end of the right temple piece, the first and second magnets being disposed to associate cooperating opposite poles for contact together at the stored configuration.

Certain embodiments may include a third catch disposed to urge the left frame front half and/or the right frame front half toward the first configuration, and to releasably hold the left half and/or right half at a deployed configuration. A workable third catch may include a pair of magnets disposed to associate cooperating opposite poles for contact together at the fully-deployed configuration. A similar such catch may be associated with either or both of the conjoining temple and frame front hinges. Certain embodiments may include similar catch structure at an intermediate-length portion of collapsible temple pieces.

Desirably, at least one of the left temple piece and the right temple piece includes an enlarged gripping lever disposed spaced apart from its respective front end, the enlarged gripping lever providing a control interface for gripping between a thumb and finger of a user's hand, the gripping lever being wider compared to other areas along a length axis of a temple piece. Typically, both of the left temple piece and the right temple piece include an enlarged gripping lever disposed spaced apart from their respective front end. A workable enlarged gripping lever includes a top surface and a bottom surface spaced apart by a thickness, the top surface and the bottom surface having a width in excess of about 0.3 inches. In certain embodiments, the width is between about 0.3 inches and about 0.6 inches. Typically, the thickness of a portion of a gripping lever is an approximately constant value. In general, the thickness is less than the width. Generally, the top surface is aligned with a temple piece length axis. In certain embodiments, the top surface is disposed in a horizontal orientation at the first configuration. Sometimes, the top surface is disposed in a vertical orientation at the first configuration.

Desirably, the frame is configured to permit one-handed deployment from the stored configuration to a first configuration wherein the frame front is unfolded to place the left half and the right half in parallel at a deployed frame front configuration, and to place the left temple piece and the right temple piece disposed substantially normal to a plane defined by the deployed frame front. Sometimes the first configuration may be the deployed configuration. Other times, a user may be required to perform one or more additional manipulation, e.g., to fully deploy temple pieces in their length direction.

In certain embodiments, the front end of the left temple piece is structured to contact the front end of the right temple piece during deployment from the stored configuration toward the first configuration, and thereby, to urge release of the first catch. Preferably, a structural interference is created between the front end of the left temple piece and the front end of the right temple piece at a temple rotation angle α of less than about 20 degrees, the structural interference causing a prying force to separate the first catch.

A one-hand deployment procedure may start with a user holding onto a gripping lever formed in a proximal temple piece. The user may pinch and roll their fingertips, or otherwise press a portion of the deploying hand against a surface (e.g., a portion of the distal temple piece), to release a temple-temple catch. Once the temple-temple catch is released, the distal temple piece is free to rotate and otherwise move toward a deployed configuration. Subsequent to such unfettered release of the distal temple piece from the stored configuration, the front end of the left temple piece and the front end of the right temple piece are desirably structured and arranged in harmony to cause a structural interference at a total opening rotation angle of less than about 35 degrees between their respective length axes, the structural interference causing a prying force to open a frame-front catch, the prying force being generated in part by rotational inertia of the proximal and distal temple pieces. The force generated by rotation of frame front left and right sides about the bridge area is consequently counter-balanced by the force generated by counter-rotation of the proximal and distal temple pieces with respect to the frame front, resulting in a smooth deployment experience for a user. Subsequent to release of the temple-temple catch, further movement of the frame toward a deployed, or first configuration, may be characterized as an inevitable cascade-release event, in which the frame-frame catch is released.

BRIEF DESCRIPTION OF THE DRAWINGS

In the drawings, in which similar elements are typically indicated by similar indicia, and which illustrate what are currently considered to be the best modes for carrying out the invention.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow. Illustrated embodiments are merely exemplary, and shall not be construed to restrict the scope of the appended claims.

Sometimes, certain elements are omitted in certain views for convenience in drafting. It is also to be understood that the present drawings are not drawn to any particular scale. Due to variability in digital model zoom factor vs. space on the page, the drawings are not even necessarily drawn to the same scale from one FIG. to another FIG. However, unless otherwise stated, the proportions and relative sizes illustrated in certain FIGs. are internally to scale and consistent for embodiments that are illustrated in FIGs. illustrating the same embodiment and presented in orthogonal views. Therefore, the present drawings may be relied-upon to convey exemplary and workable relative size information, rotation angles, and angle-of-contact, among other analytical data.

For purpose of this disclosure, the frame of reference for the various elements of disclosed embodiments will generally be made with reference to a fully-deployed frame installed on a user's head, when the user is standing erect, unless an alternative construction is explicitly described in context. Therefore, "horizontal" will be in the world's local horizontal frame of reference. The same applies to the "vertical" direction. "Left" and "right" correspond to a user's left and right directions. "Forward" is defined by a vector extending from a user's center axis and extending in a direction toward a user's front side. Therefore, the "front" side or end of an element applies to the side or end of the eyewear or constituent element that is disposed furthest forward. The opposite applies to "rear" side or end. The transverse direction is indicated by a vector disposed in a horizontal plane, generally propagating from a length axis, or other explicitly referenced feature, of a component. A loose interpretation of "parallel" is intended for purpose of claim construction. Unless otherwise explicitly set forth, "parallel" encompasses up to the conventional small angle approximation of about 15 degrees.

Figure 1:
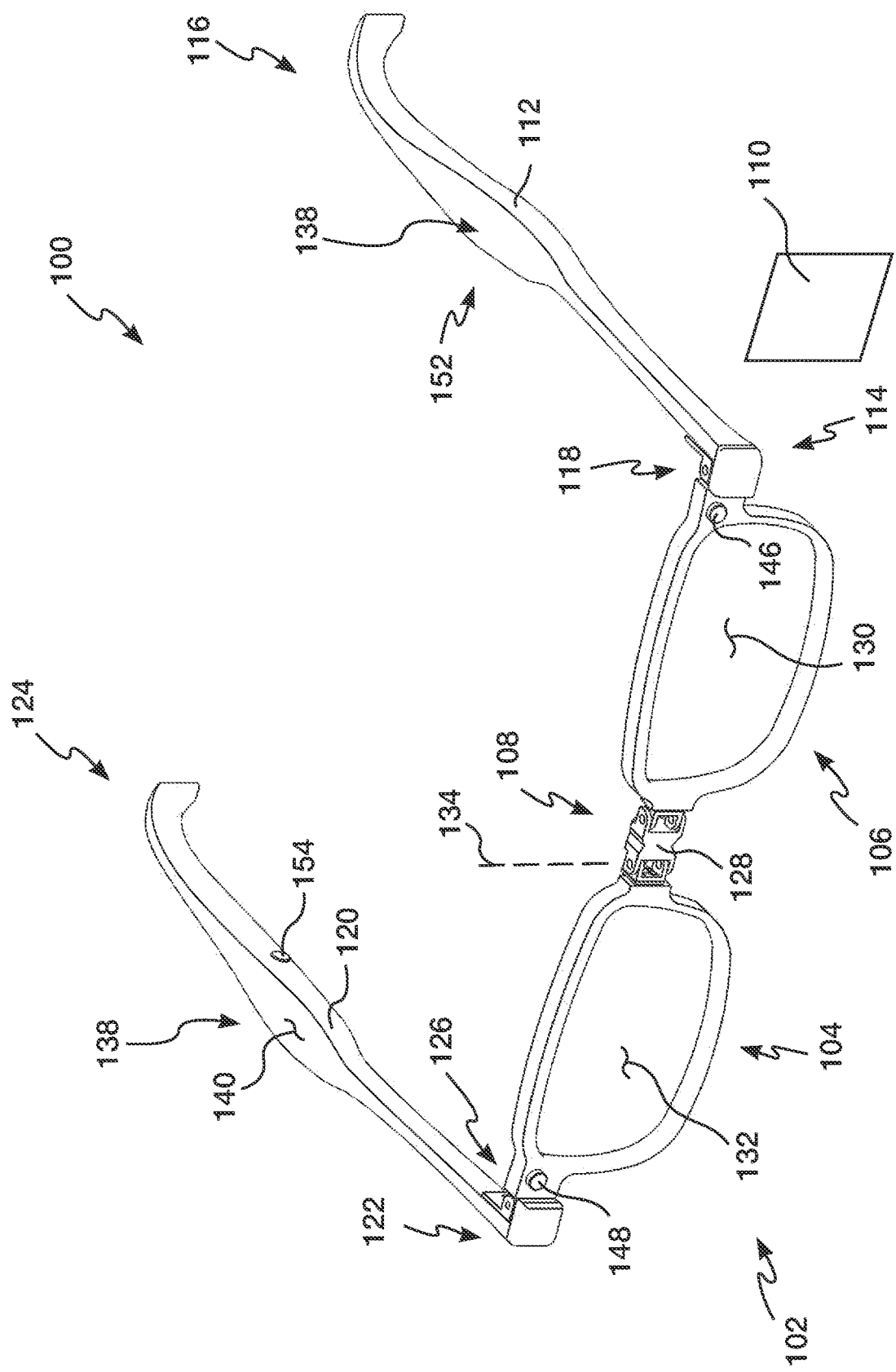
FIG. 1 is a view in perspective of a deployed first embodiment structured according to certain principles of the instant invention.

A first exemplary embodiment of a folding frame for eyeglasses according to certain principles of the invention is generally indicated at 100 in FIG. 1. In this disclosure, elements that may be included in certain embodiments, but that are deemed not important for conveying the nature of the invention (e.g., such as self-adjusting nose-support pieces, optical lenses, lens-holding sockets, etc.) may be omitted from certain FIGs. for simplicity and clarity. It is to be understood that conventional elements that may be included in frames for eyewear (but not illustrated herein) may be included in certain embodiments according to the instant invention.

Illustrated folding frame 100 includes a frame front, generally 102, which includes a right half, generally 104, and a left half, generally 106. Each of the right and left halves are configured to hold an optical lens. The frame front right and left halves are connected together at a bridge, generally 108. In FIG. 1, folding frame 100 is in a fully-deployed configuration, with frame front right and left halves being disposed in parallel in a common plane 110. It is to be recognized that plane 110 is necessarily an approximation, and is simply suggested by the orientation of halves 104, 106 in a deployed configuration. The centerlines of respective left and right halves that are characterized in this disclosure as being "parallel" may depart from an actual parallel orientation, but generally not by more than about 15 degrees in an installed configuration.

A left temple piece 112 extends in a length direction between a front end, generally 114, and a rear end, generally 116. The front end of left temple piece 112 is pivotally connected to the left half 106 by way of a hinge, generally indicated at 118. Hinge 118 is configured to provide approximately 180 degrees of rotation between temple piece 112 and left half 106. The rear end of the left temple piece 112 is configured for association with the left side of a user's head when the frame 100 is deployed and disposed at an installed position on the user's head.

Similarly, right temple piece 120 extends between a front end, generally 122, and a rear end, generally 124. The front end of right temple piece 120 is pivotally connected to the right half 104 by way of a hinge, generally indicated at 126. Hinge 126 is configured to provide approximately 180 degrees of rotation between temple piece 120 and right half 104. The rear end of the right temple piece 120 is configured for association with the right side of a user's head when the frame 100 is deployed and disposed at an installed position on the user's head.

With particular reference now to FIGS. 1-5, and 10, it may be seen that a hinge 128 is disposed in bridge 108 to rotatably connect the left half 106 to the right half 104. Hinge 128 is configured to permit folding the frame front 102 from a deployed configuration to a stored configuration resembling a W (see e.g., FIGS. 2 and 10), such that the left half 106 rotates by about 180 degrees with respect to the right half 104 to dispose the front surface 130 of the left half 106 and the front surface 132 of the right half 104 adjacent to one another with the left half 106 and the right half 104 disposed in parallel at the stored configuration.

Figure 5:
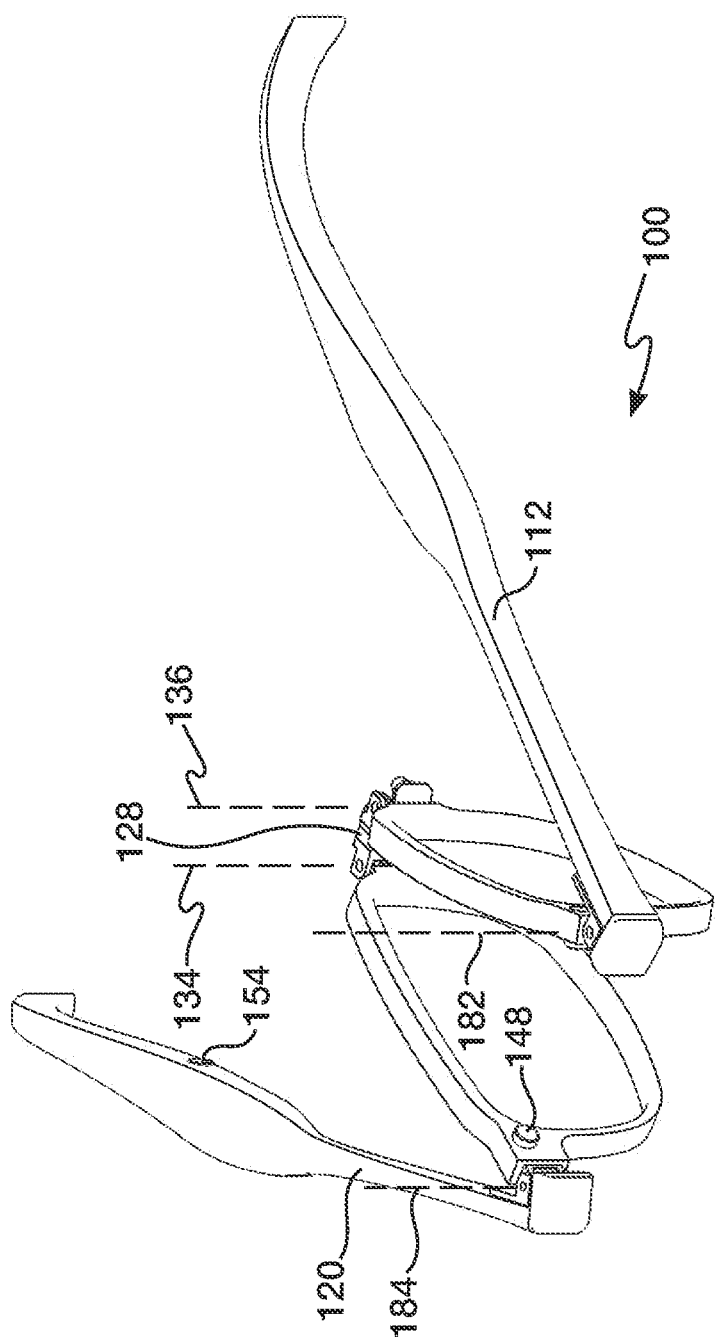
FIG. 5 is the embodiment in FIG. 1, at an intermediate configuration and further deployed compared to that illustrated in FIG. 3.
Figure 6:
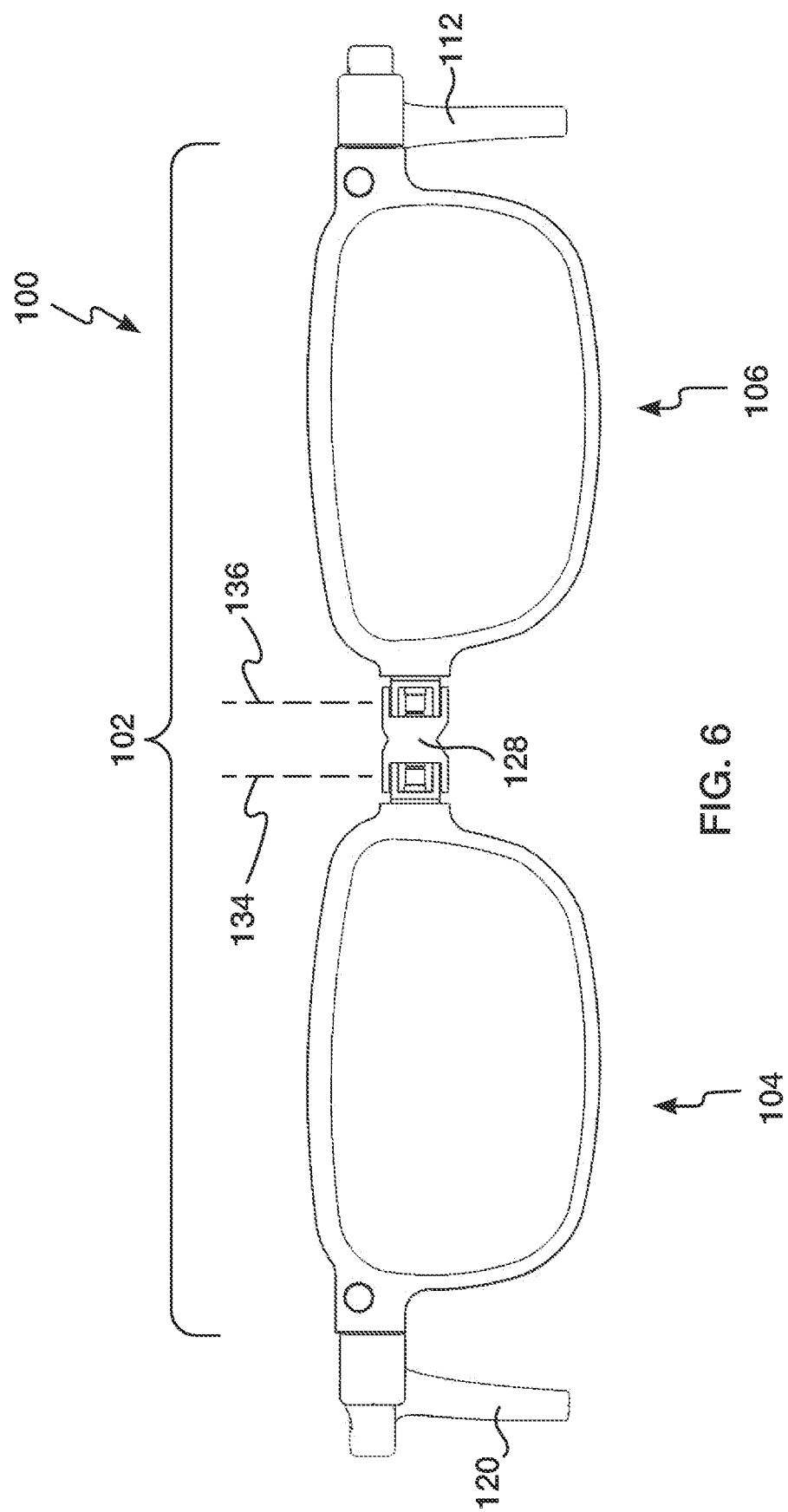
FIG. 6 is a front view in elevation of the embodiment in FIG. 1.
Figure 7:
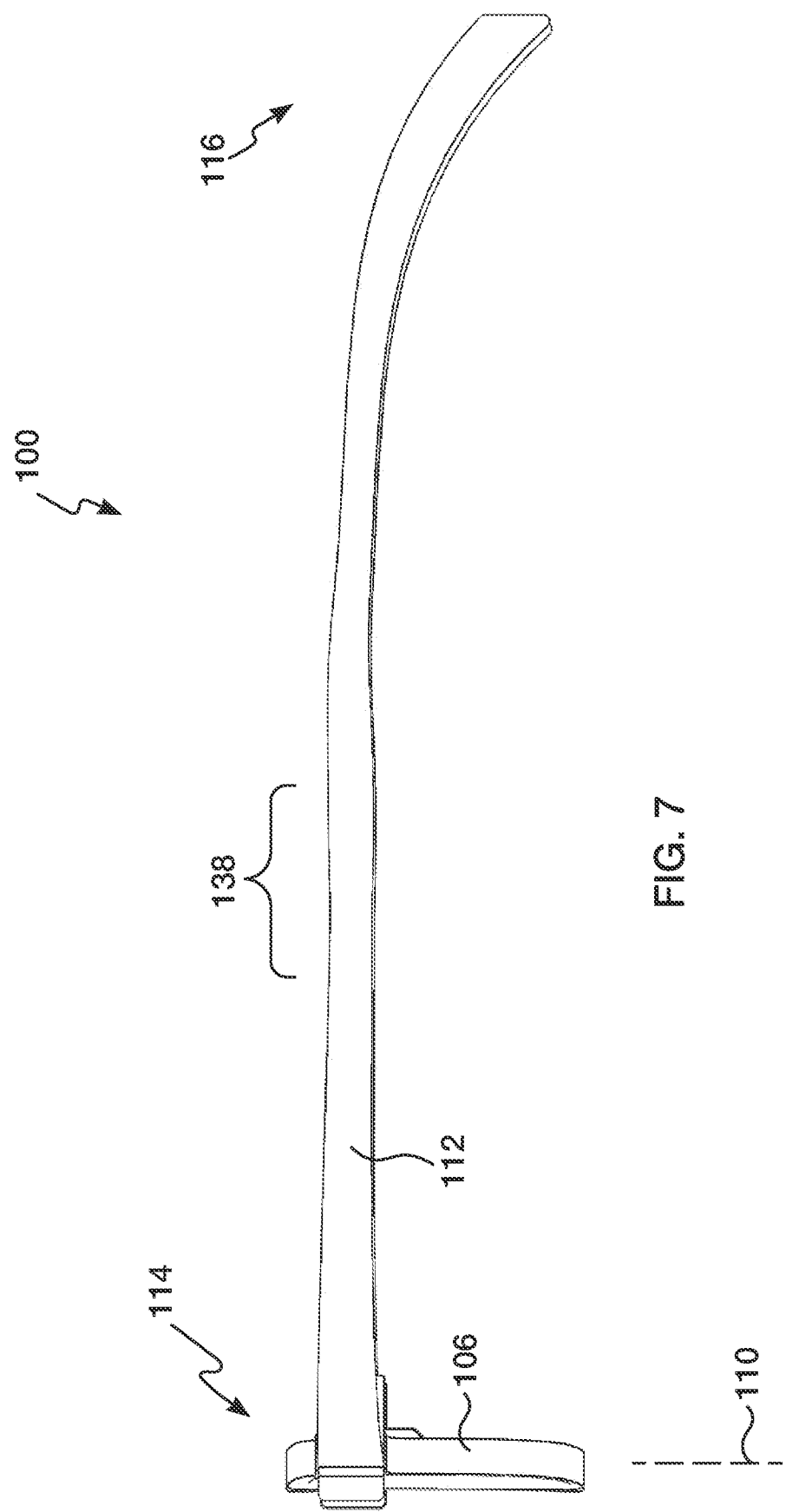
FIG. 7 is a left-side view of the embodiment in FIG. 1.
Figure 8:
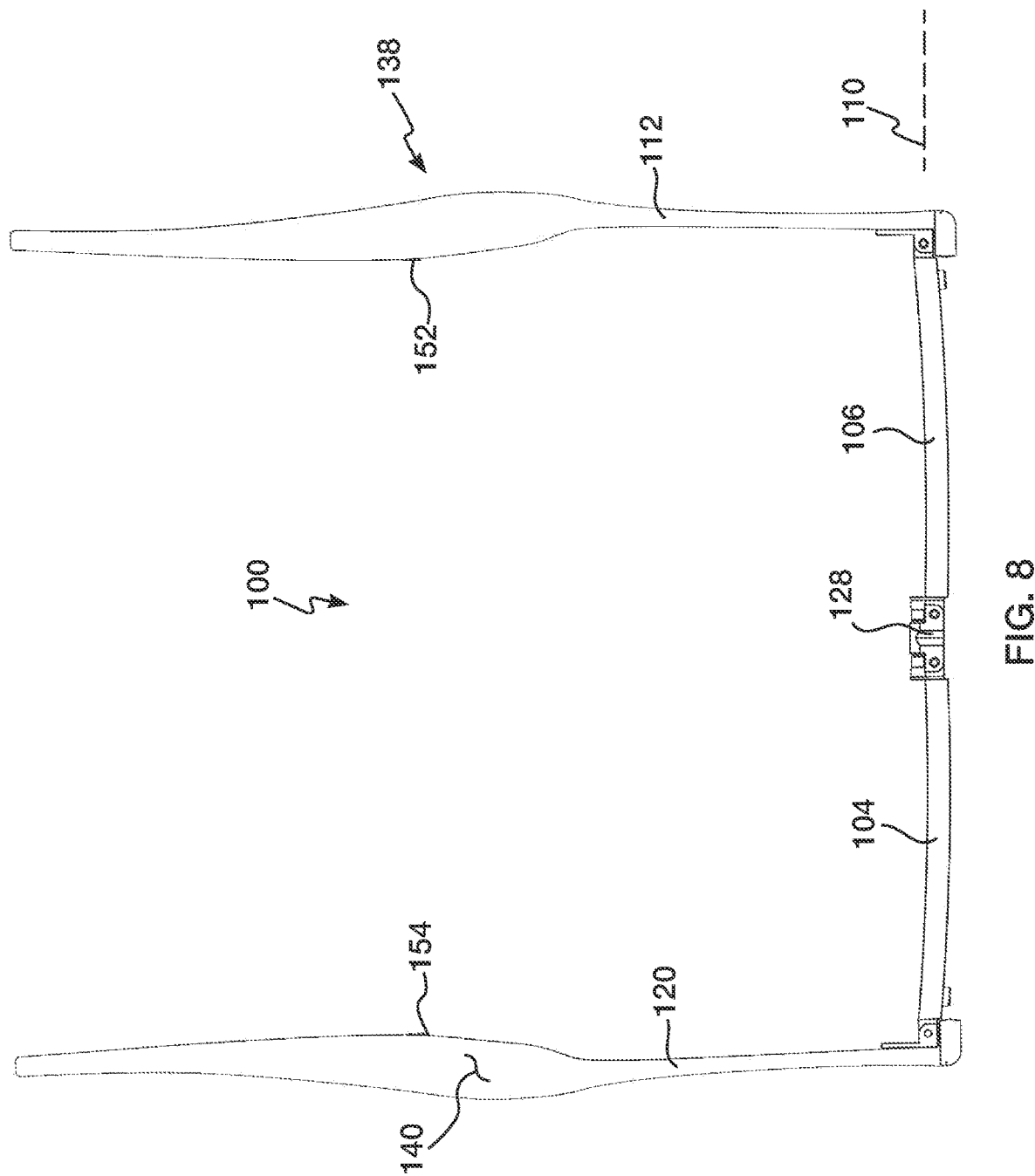
FIG. 8 is a top view of the embodiment in FIG. 1.
Figure 9:
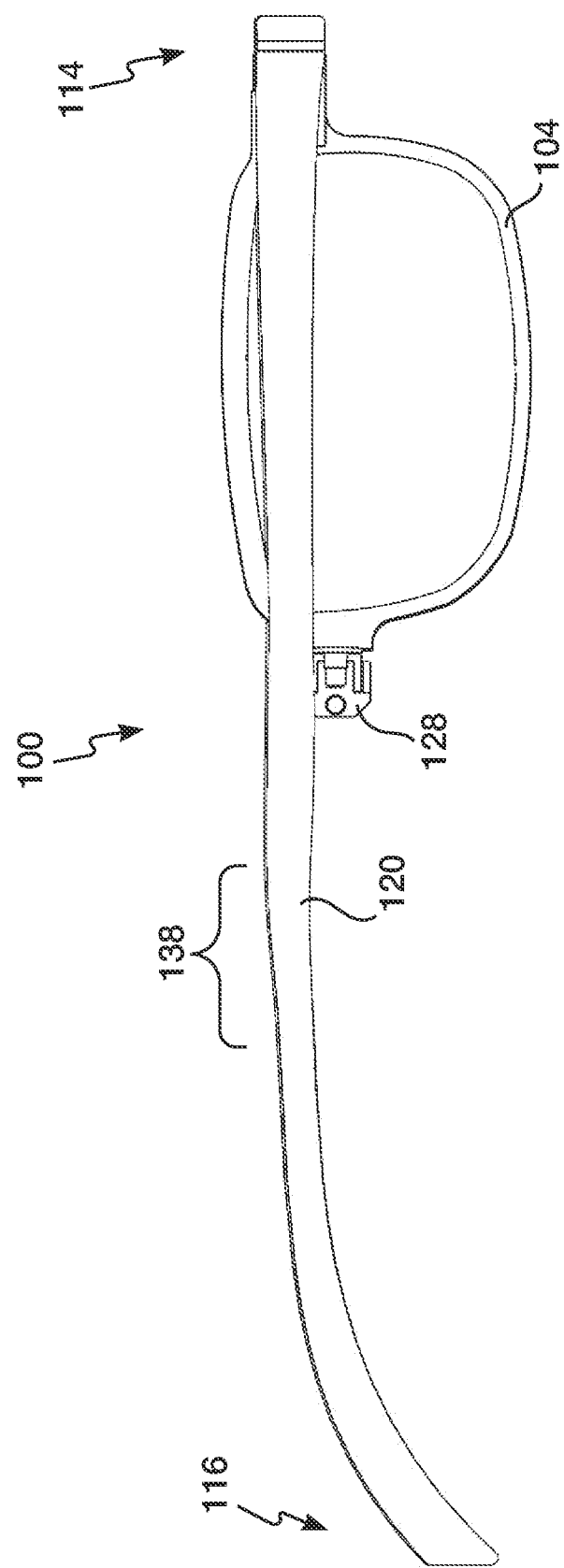
FIG. 9 is a right-side view of the embodiment in FIG. 1, but at a stored configuration.

With reference now to FIGS. 5 and 6, illustrated hinge 128 includes a first pivot axis 134 and a second pivot axis 136, the first pivot axis 134 being disposed approximately in parallel with, and spaced apart from, the second pivot axis 136. As illustrated, spaced-apart pivot axes 134, 136 can provide a streamlined front surface of frame 102, and still permit folding the frame front 102 to dispose the halves 104, 106 in parallel. However, it is within contemplation that an alternative and workable hinge 128 may be configured to operate about a single pivot axis. An exemplary such hinge may simply provide its pivot axis at a more forward location, e.g., spaced forward from plane 110 or forward compared to axes 134, 136.

Desirably, at least one of the left temple piece 112 and the right temple piece 120 includes an enlarged gripping lever, generally 138, disposed spaced apart from a respective temple piece front end. The embodiment illustrated in FIG. 1 includes a gripping lever 138 associated with both of the left and right temple pieces. A workable enlarged gripping lever 138 is configured to provide a control interface for gripping between a thumb and finger to facilitate orientation of a frame (e.g., with respect to frame rotation about a temple piece length axis) when the frame is donned by a user.

In certain cases, and as illustrated in e.g., FIGS. 1 and 4A, the gripping lever 138 has a width W that is wider compared to other areas along a length axis of a temple piece. It is currently preferred for the width W to be oriented in a transverse direction. However, in certain cases, the width W may be disposed in a vertical, or other direction. Further illustrated in FIG. 4A, a gripping lever 138 may have a top surface 140 and a bottom surface 142 spaced apart by a thickness or height H. The gripping lever 138 may include a portion having an approximately constant height H. In a currently preferred embodiment, the top surface 140 and the bottom surface 142 have a width W in excess of about 0.3 inches. A workable width W is between about 0.3 inches and about 0.6 inches, or so. Often, the thickness or height H is less than the width W. A workable ratio of width W to height H extends from less than 1:1 to 1:1; 2:1; 3:1; 4:1; 5:1; 6:1; and even more in certain cases.

Typically, the top surface 140 is aligned with a temple piece length axis. Preferably, the top surface 140 is disposed in a horizontal orientation at a first configuration wherein the frame front is deployed in plane 110, which plane is reasonably or approximately defined by the deployed frame front, and the left temple piece and the right temple piece are disposed substantially normal to the plane 110. However, in certain cases, the top surface 140 may be disposed in a vertical or other orientation at the first configuration.

The currently preferred horizontal orientation of gripping lever 138 is unconventional and even surprising. A horizontally disposed gripping lever provides a grip interface that depends entirely on friction to maintain the frame in a user's grasp during frame deployment. In contrast, a conventional (and more robust) gripping interface is clocked by approximately 90 degrees from the preferred horizontal configuration, and provides a structural interference by disposing user's digits on opposite sides of a temple piece and in the plane of rotation/expansion of a deploying frame. Therefore, and as detailed below, preferred embodiments are structured to provide a "smooth" frame deployment to avoid loss of a user's friction-grip on the gripping lever 138 when frame elements snap into a deployed configuration.

Figure 11:
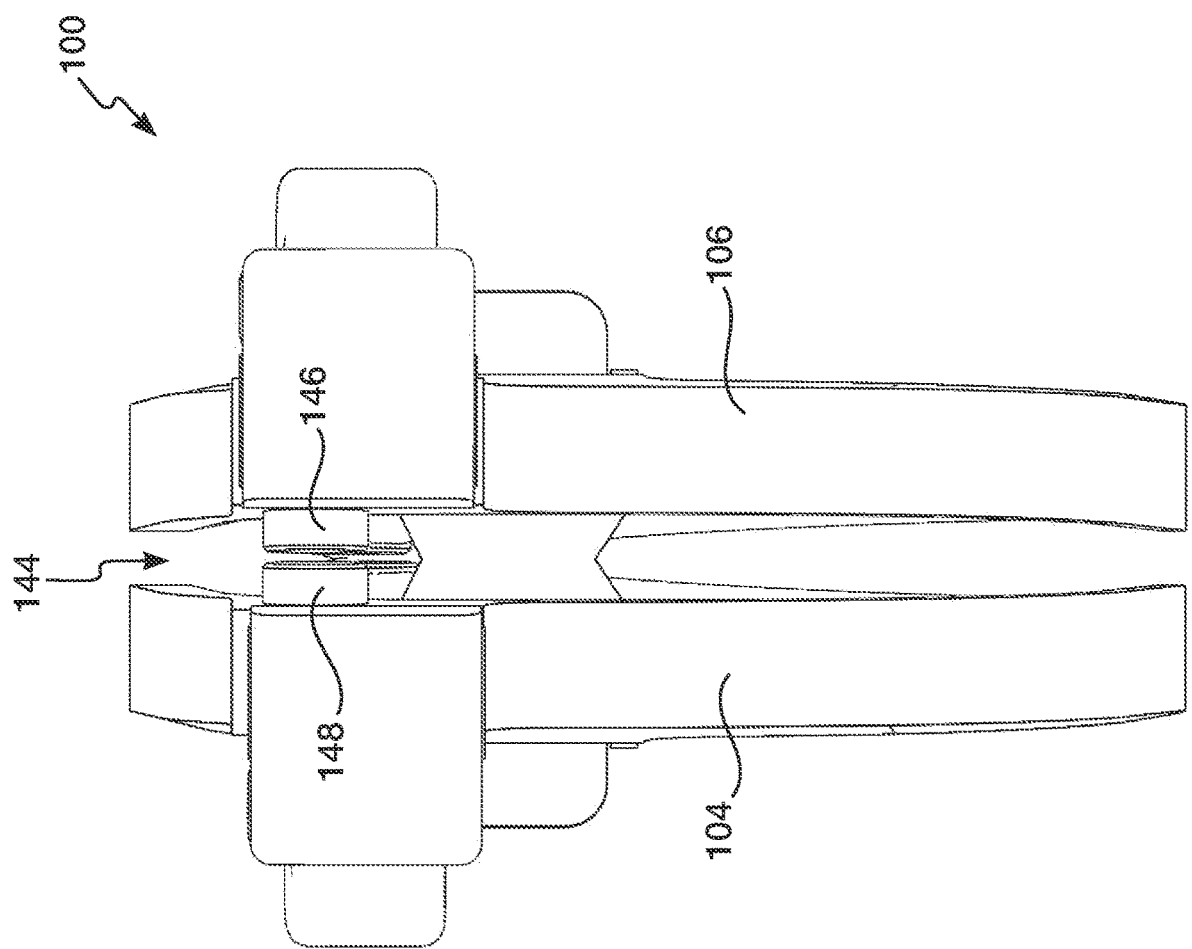
FIG. 11 is a close-up front view of the embodiment in FIG. 1, in a stored configuration.

With reference now to FIGS. 1 and 11, frame 100 includes a first catch, generally indicated at 144, configured to releaseably hold the left half 106 at a fixed parallel association with respect to the right half 104 at a stored configuration. A workable first catch 144 may include the illustrated paired magnets 146 and 148, with the magnets being disposed to associate cooperating opposite poles for contact together at the stored configuration. The first catch may sometimes be made reference to as a frame-frame catch, and includes any structure operable to releaseably maintain the frame halves in parallel at the stored configuration.

Figure 4:
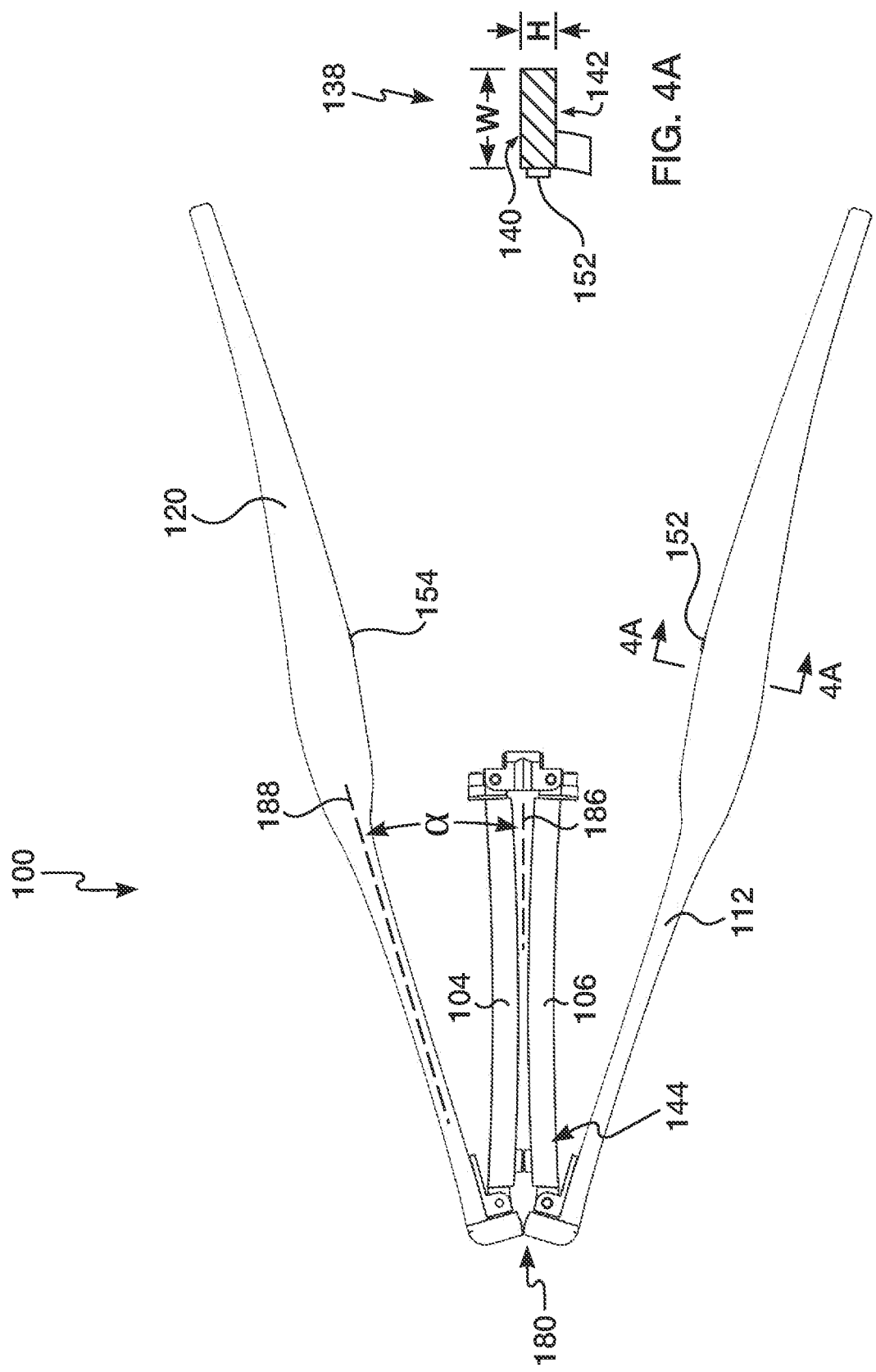
FIG. 4 is a top view of the embodiment illustrated in FIG. 3.
Figure 10:
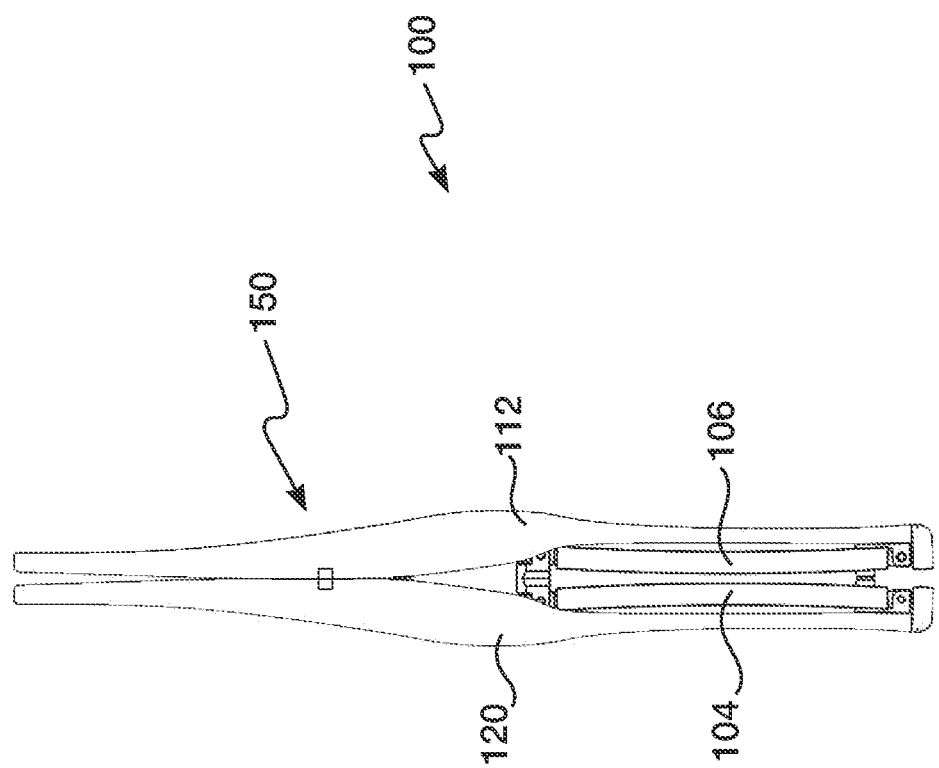
FIG. 10 is a top view of the embodiment in FIG. 1.

As illustrated in FIGS. 1, 4, and 10, frame 100 also includes a second catch, generally indicated at 150, configured to releaseably hold the left temple piece 112 at a fixed parallel association with the right temple piece 120 at the stored configuration. A workable second catch 150 may include the illustrated paired magnets 152 and 154, with the magnets being disposed to associate cooperating opposite poles for contact together at the stored configuration. The second catch may be made reference to as a temple-temple catch, and includes any structure operable to releasably hold the temple pieces in parallel at the stored configuration.

Figure 12:
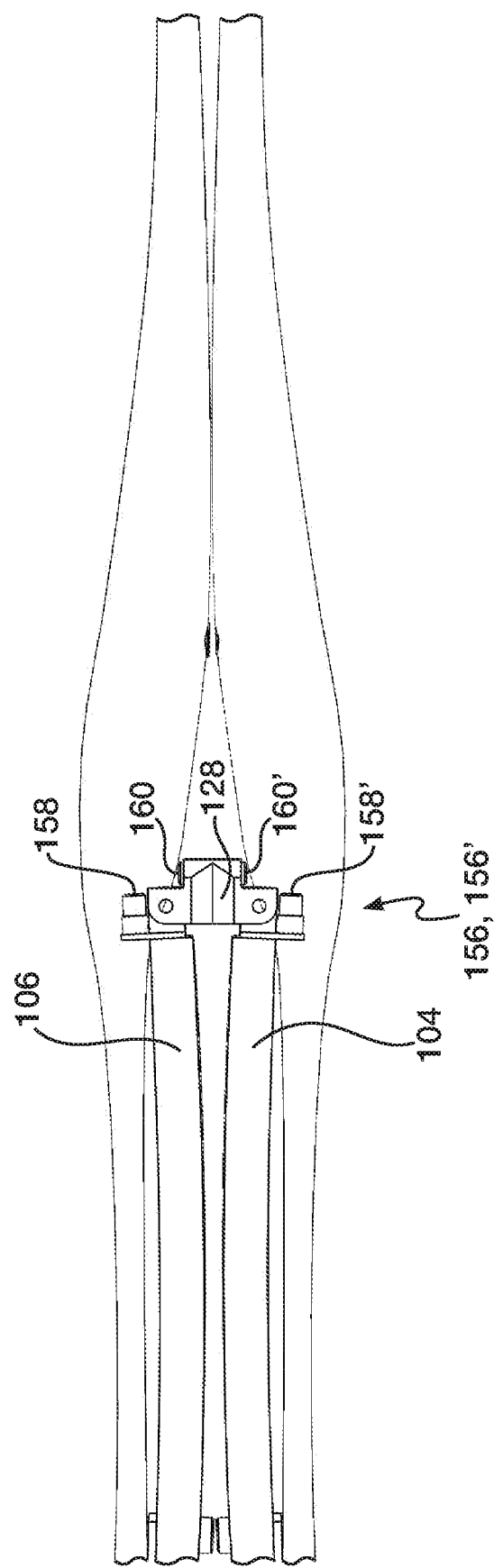
FIG. 12 is a close-up bottom view of a portion of the embodiment in FIG. 1, in a stored configuration.
Figure 13:
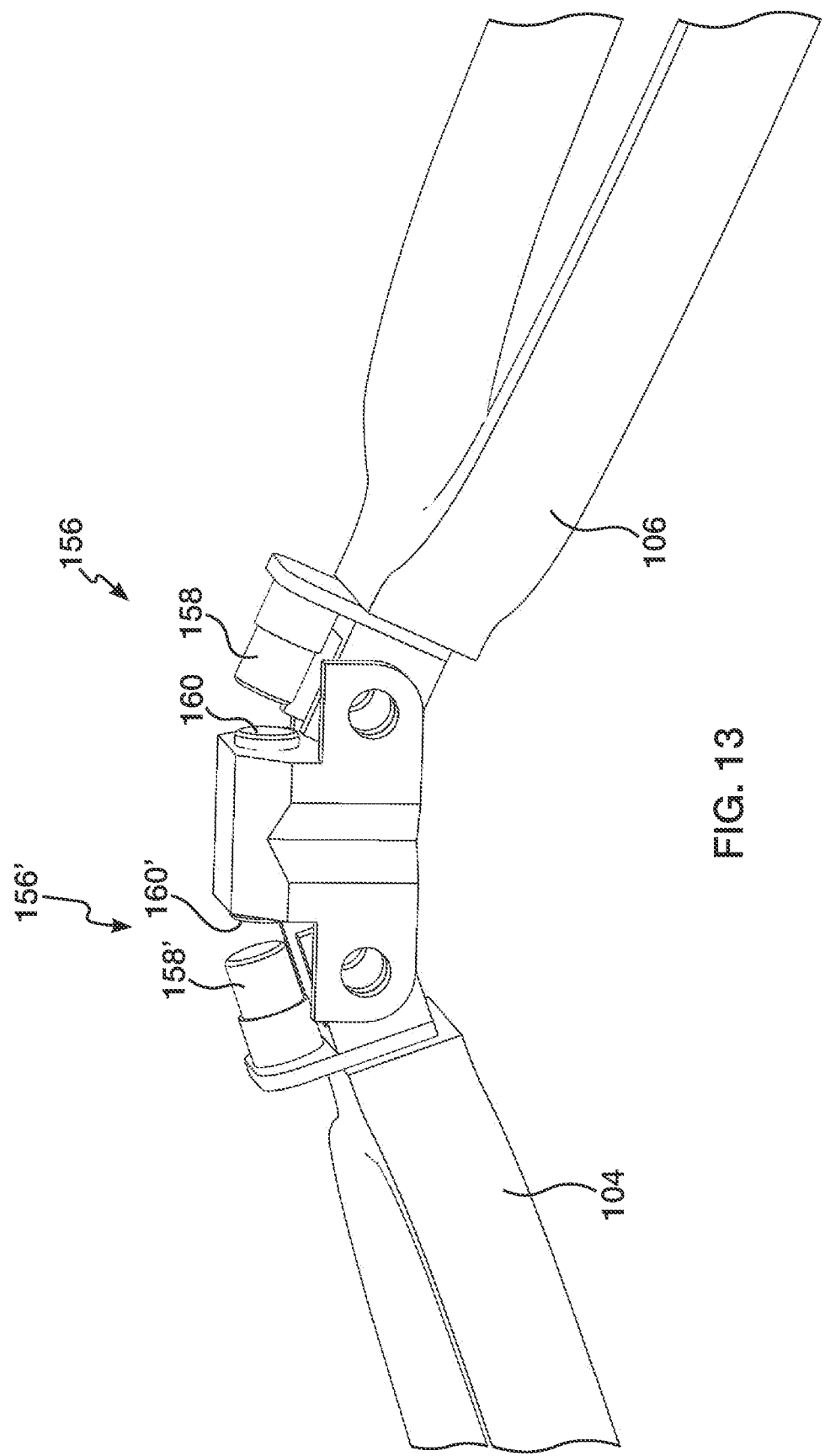
FIG. 13 is a close-up view in perspective of the bridge area of the embodiment in FIG. 1, at an intermediate configuration.
Figure 14:
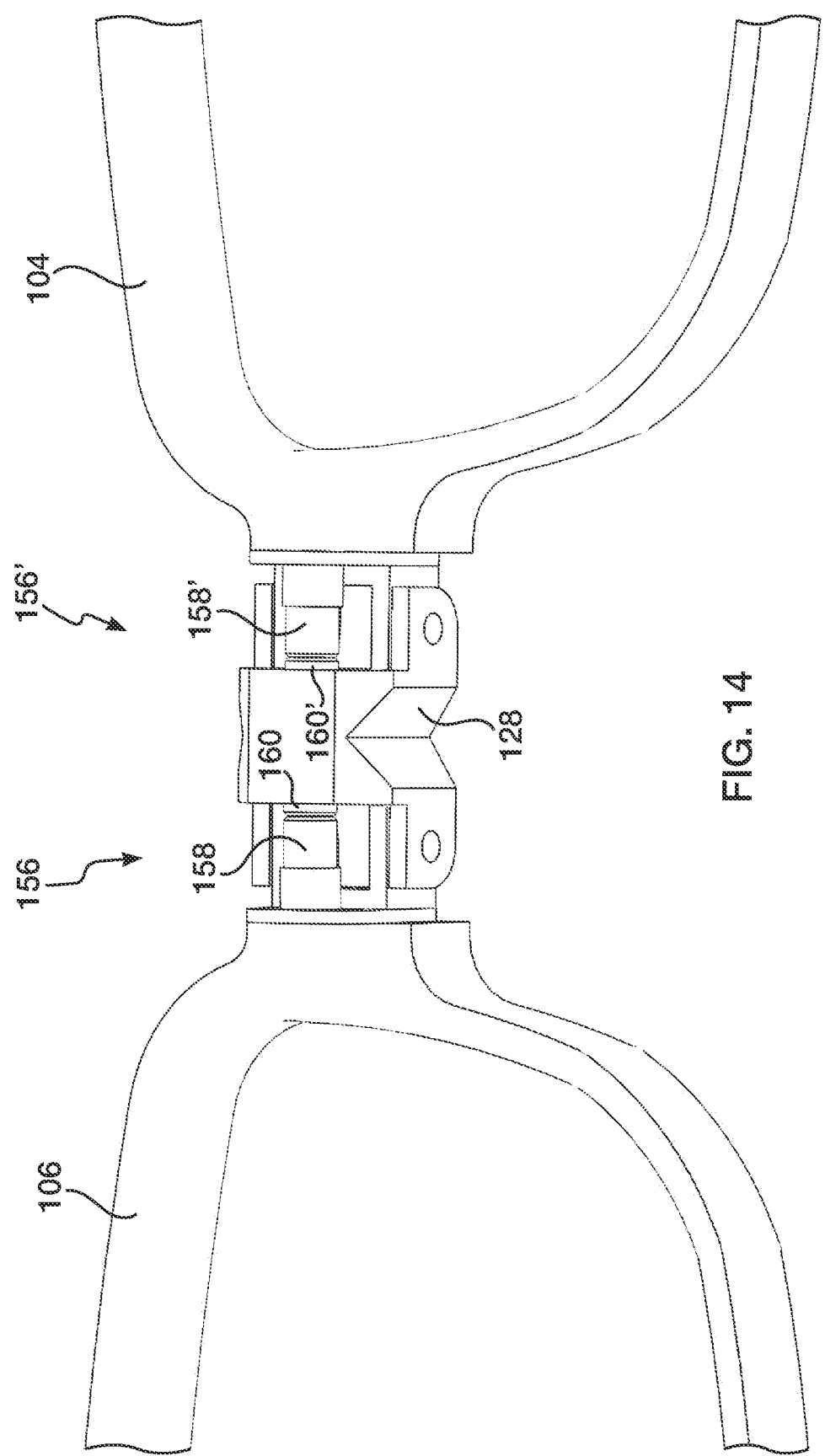
FIG. 14 is a close-up view in perspective of the bridge area of the embodiment in FIG. 1, at a first configuration.

Certain embodiments may include one or more additional catch to maintain cooperating elements at a deployed configuration. With reference to FIGS. 12, 13, and 14, an exemplary third catch, generally indicated at 156, may be arranged to releasably hold the left half 106 at a fixed deployed orientation with respect to the hinge 128. Third catch 156 also preferable includes a pair of magnets 158, 160, disposed for contact of opposite poles at a fully deployed configuration. As illustrated, a similar catch 156' may be provided. Catch 156' includes paired magnets 158' and 160' disposed to hold the right half 104 at a fixed fully-deployed configuration with respect to hinge 128. It is within contemplation that a single catch may alternatively be provided to directly hold the left half 106 in a fully-deployed configuration with respect to the right half 104.

Figure 2:
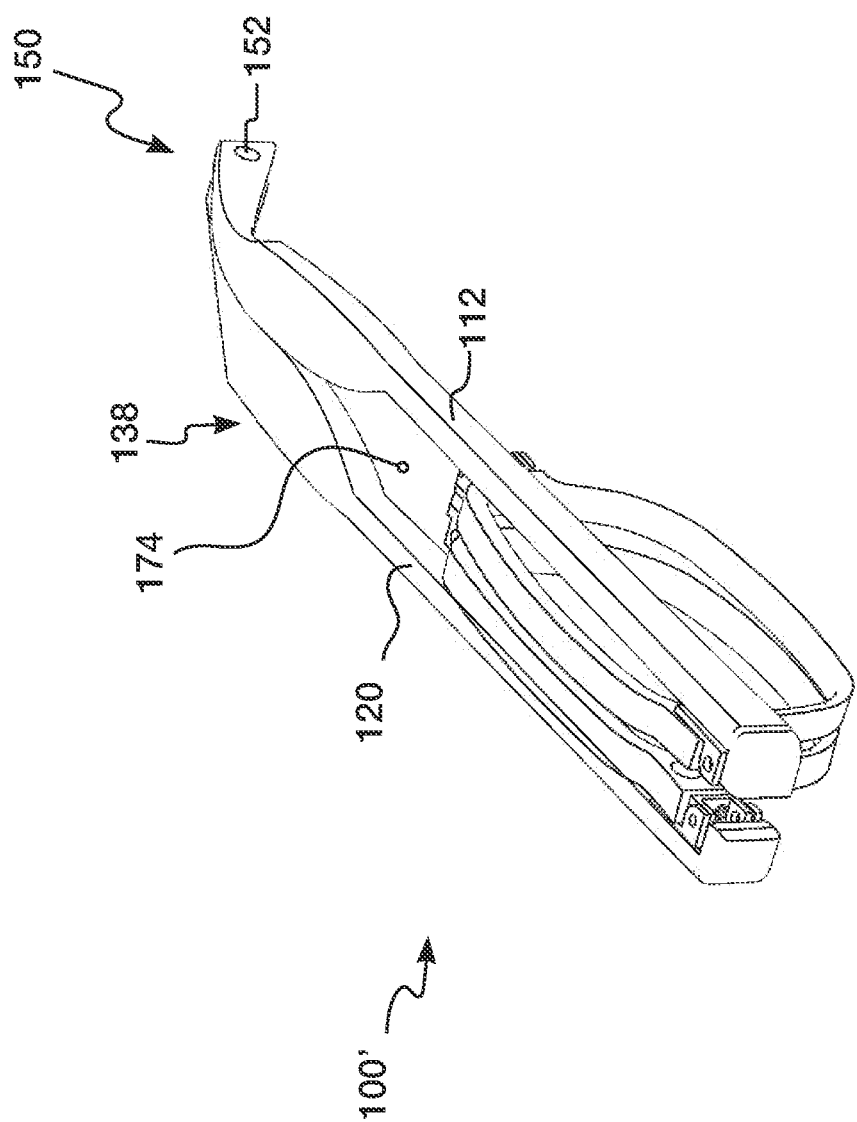
FIG. 2 is a view in perspective of a second embodiment, similar to the embodiment in FIG. 1, but in a stored configuration.
Figure 3:
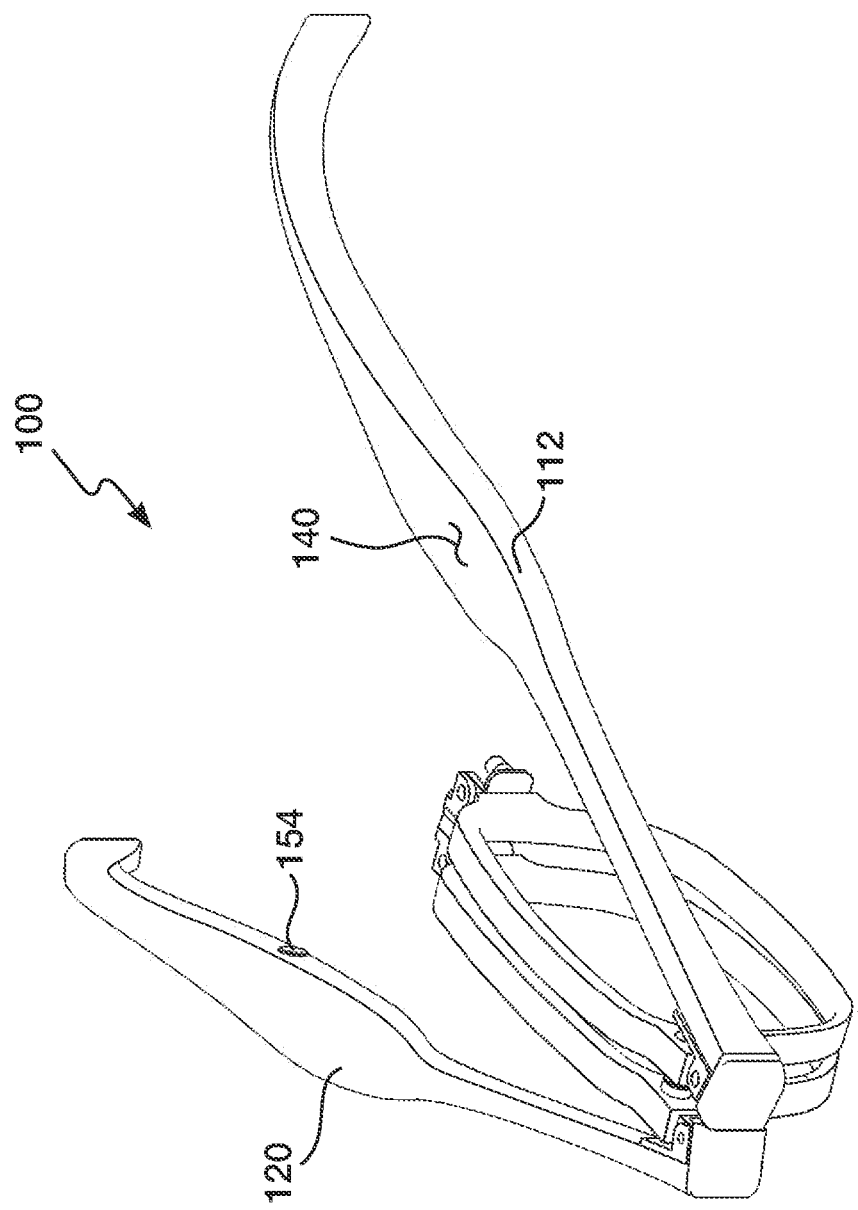
FIG. 3 is a view in perspective of the embodiment in FIG. 1, at a structural interference configuration.

As seen by comparing FIG. 4 and FIG. 2, the location of a catch, such as exemplary second catch 150, may vary between different embodiments, as desired. An alternative to a catch 144, 150, 156 may be formed by cooperating structure configured to make a releasable structural interference, friction fit, and the like.

It is currently preferred to provide a plurality of biasing elements that are configured and arranged to urge movement of various components of a frame toward a first configuration. The first configuration may be fully deployed, or partially deployed.

Figure 15:
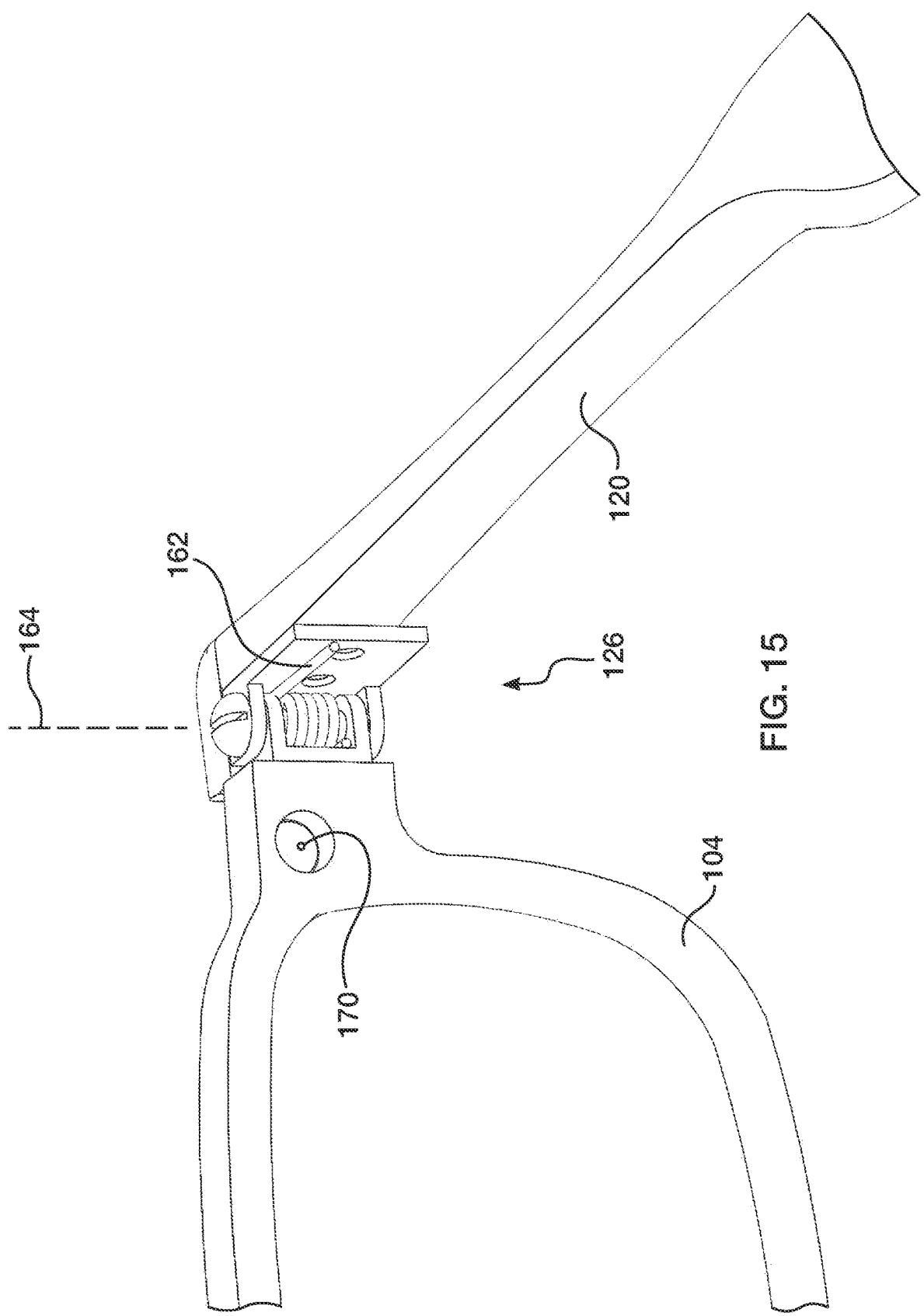
FIG. 15 is a close-up view in perspective from behind of a right temple front area of the embodiment in FIG. 1, at a first configuration.
Figure 16:
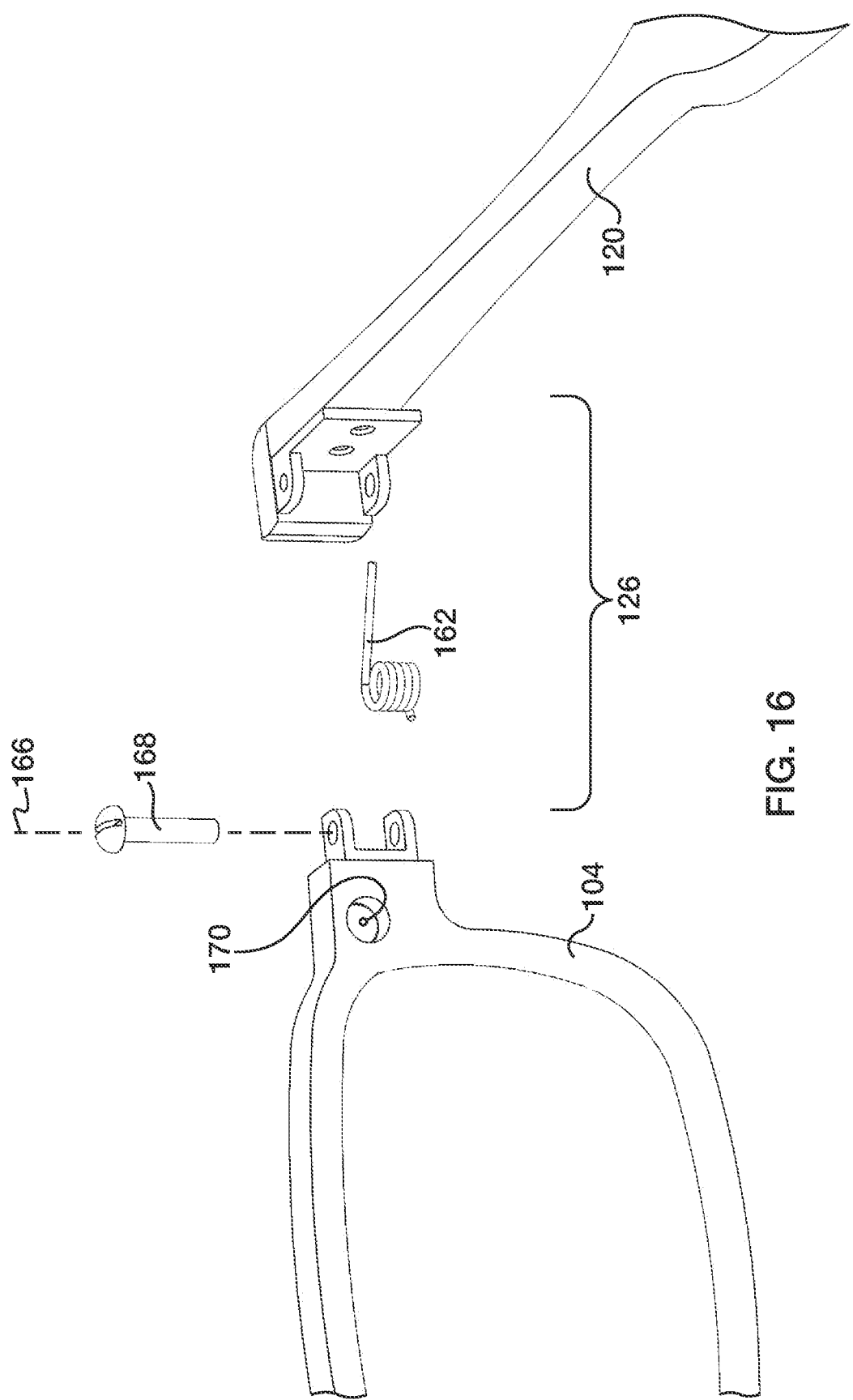
FIG. 16 is a close-up exploded assembly view in perspective from behind of the embodiment in FIG. 15.

As seen in FIGS. 15 and 16, an exemplary biasing element includes a torsion spring 162. The hinge assembly generally indicated at 126 in FIGS. 15 and 16 is exemplary of a workable hinge assembly that may be modified as required or desired and disposed in some form at any hinge location in an eyeglasses frame assembly. Illustrated hinge assembly 126 is configured to urge rotation of cooperating frame components through about 90 degrees, or so, of rotation toward a deployed configuration. However, it is readily understood that a similar hinge assembly may be provided to urge component rotation about a rotation axis 164 through about even 180 degrees, or more. It is further to be noted that certain FIGs. do not illustrate certain components of a hinge assembly for clarity and simplification of the drawings.

With continued reference to FIGS. 15 and 16, hinge assembly 126 includes a spring 162 disposed for torsional action about centerline 166 of fastener 168. The fastener centerline axis 166 essentially creates the rotation axis 164 of the hinge assembly 126. Illustrated socket 170 is provided to hold a magnet, such as magnet 148.

Preferred embodiments of frames for eyeglasses are structured to permit one-handed deployment from a stored configuration to a first configuration wherein the frame front is unfolded to place the left half and the right half in parallel at the deployed configuration of frame front 102, and to place the left temple piece and the right temple piece disposed substantially normal to a plane 110 defined by the deployed frame front 102. Certain embodiments may require subsequent manipulation to further move certain components of the eyeglasses from the first configuration to a fully-deployed configuration that is ready for installation onto a user's head.

Figure 17:
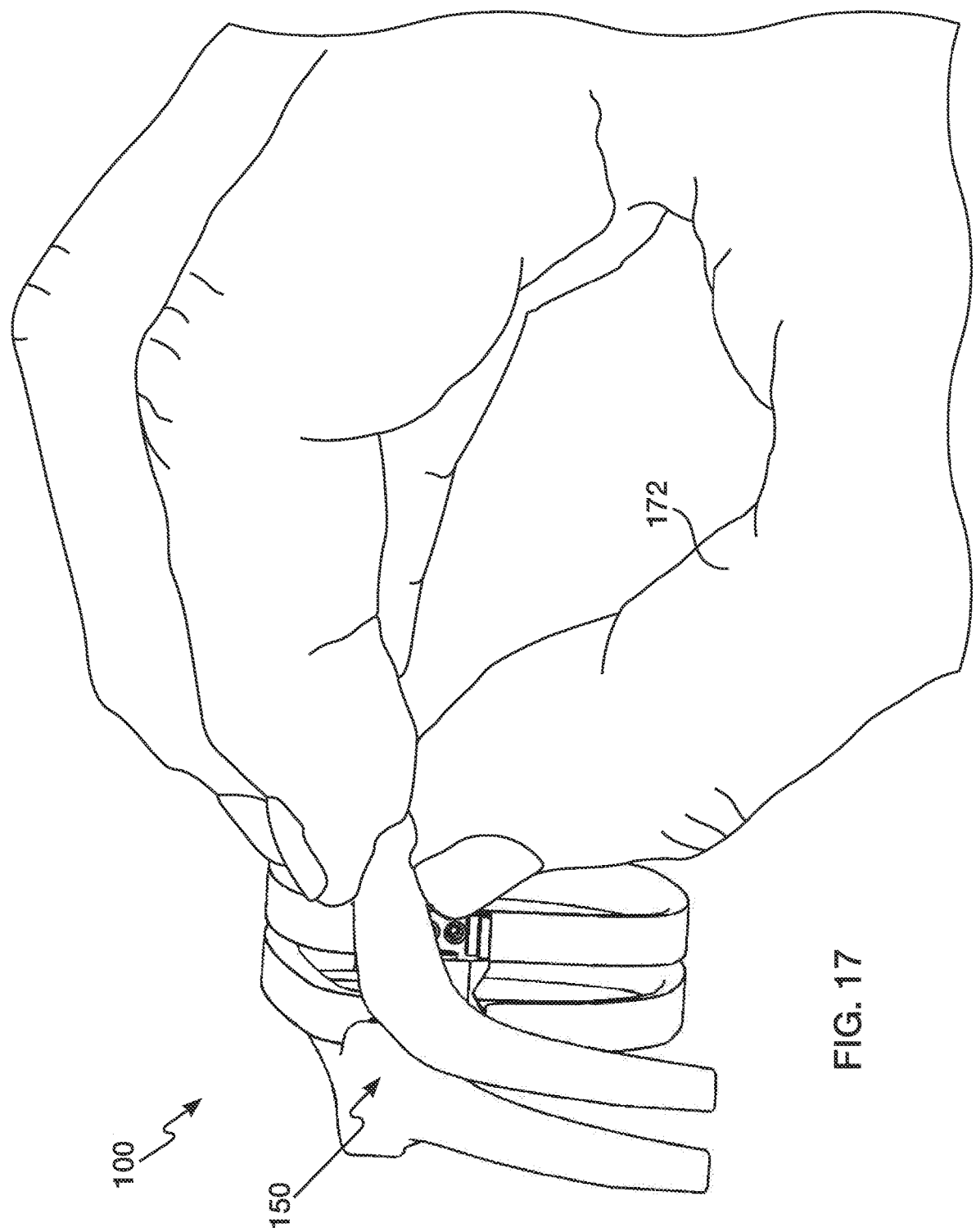
FIG. 17 is a perspective view from behind of a user holding an embodiment according to certain principles of the invention at a stored configuration.
Figure 18:
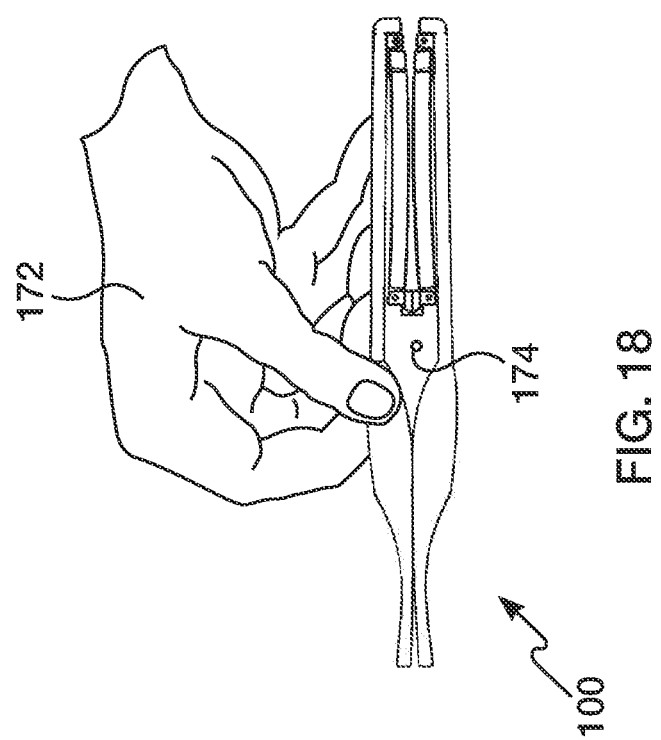
FIG. 18 is a bottom view of a user holding an embodiment according to certain principles of the invention at a stored configuration.
Figure 19:
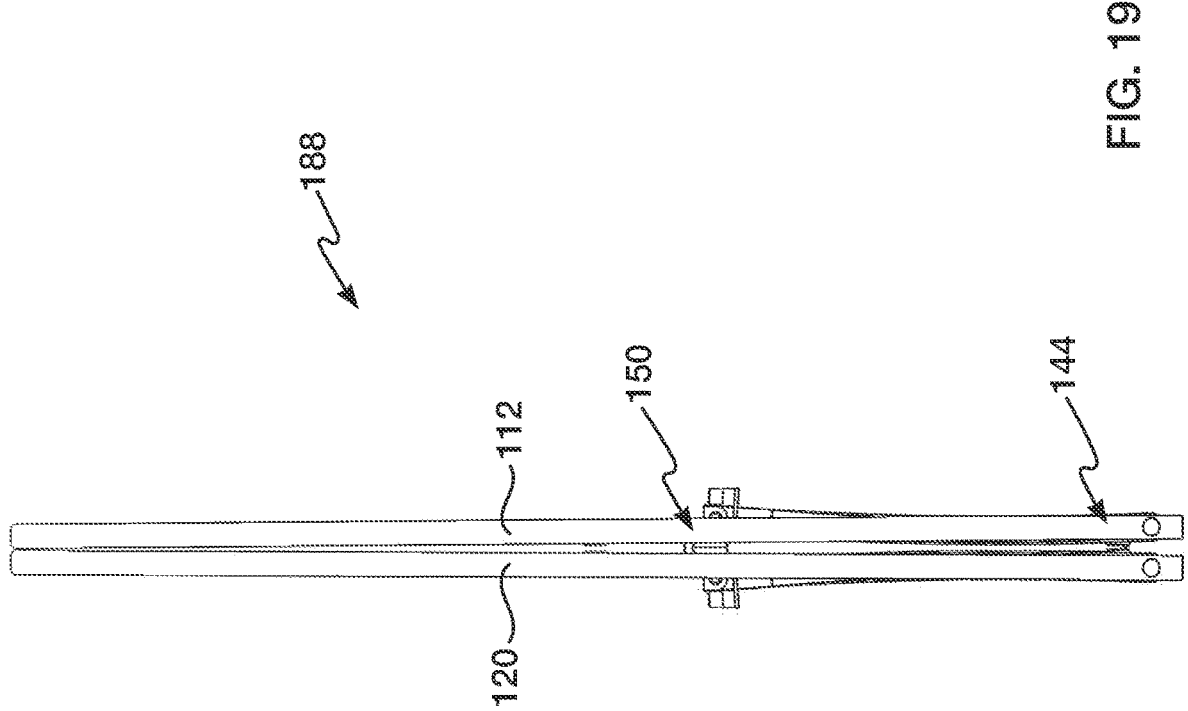
FIG. 19 is a top view of an alternative embodiment in a stored configuration.
Figure 20:
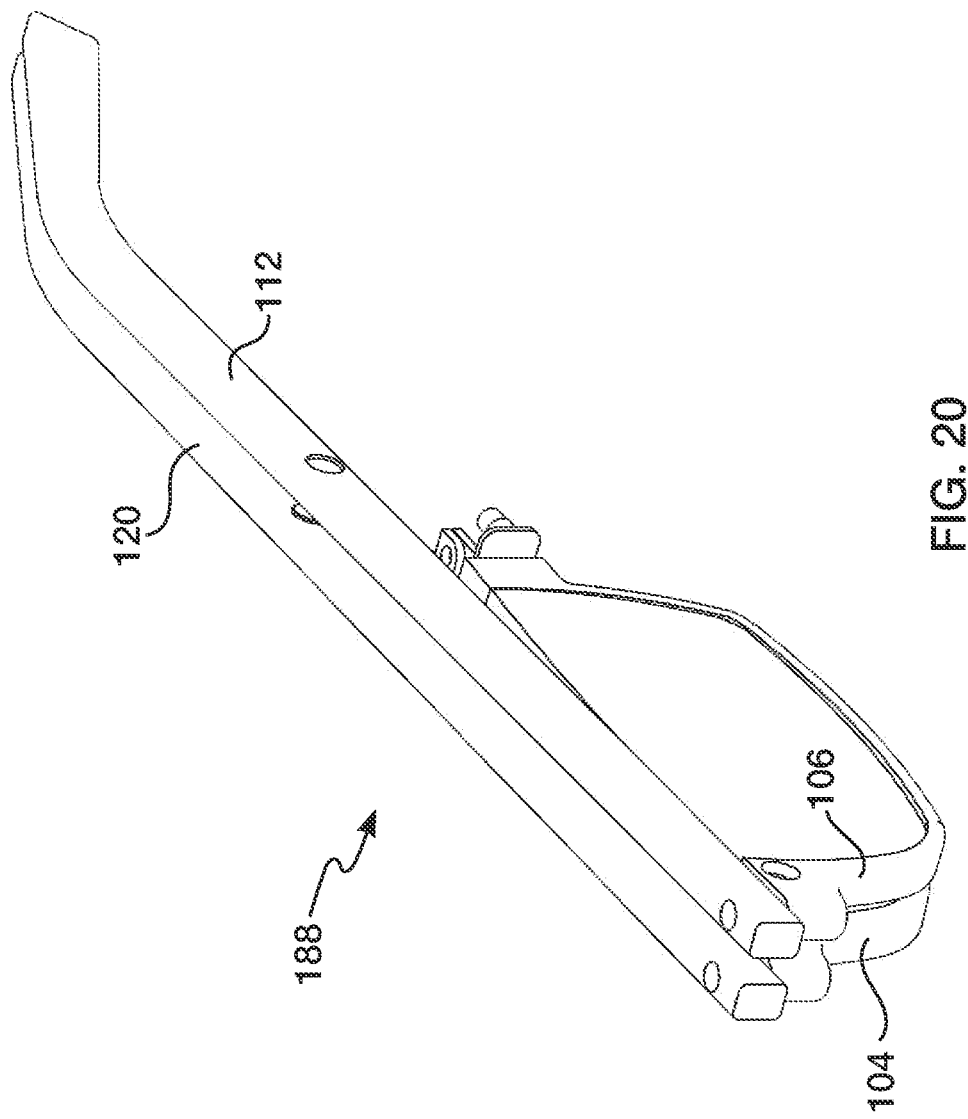
FIG. 20 is a perspective view of the embodiment in FIG. 19.
Figure 21:
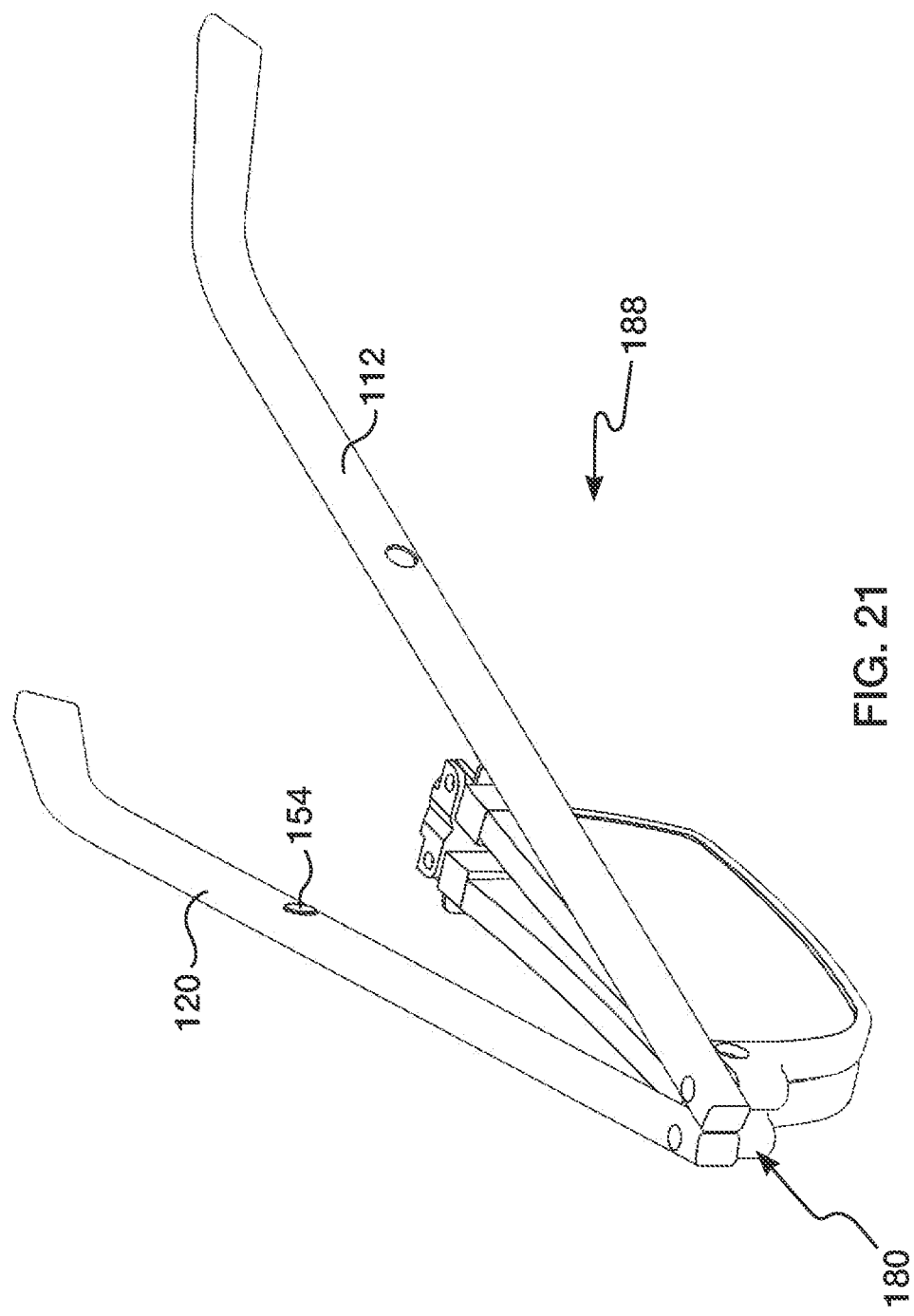
FIG. 21 is a view in perspective of the embodiment in FIG. 19, at a structural interference configuration.
Figure 22:
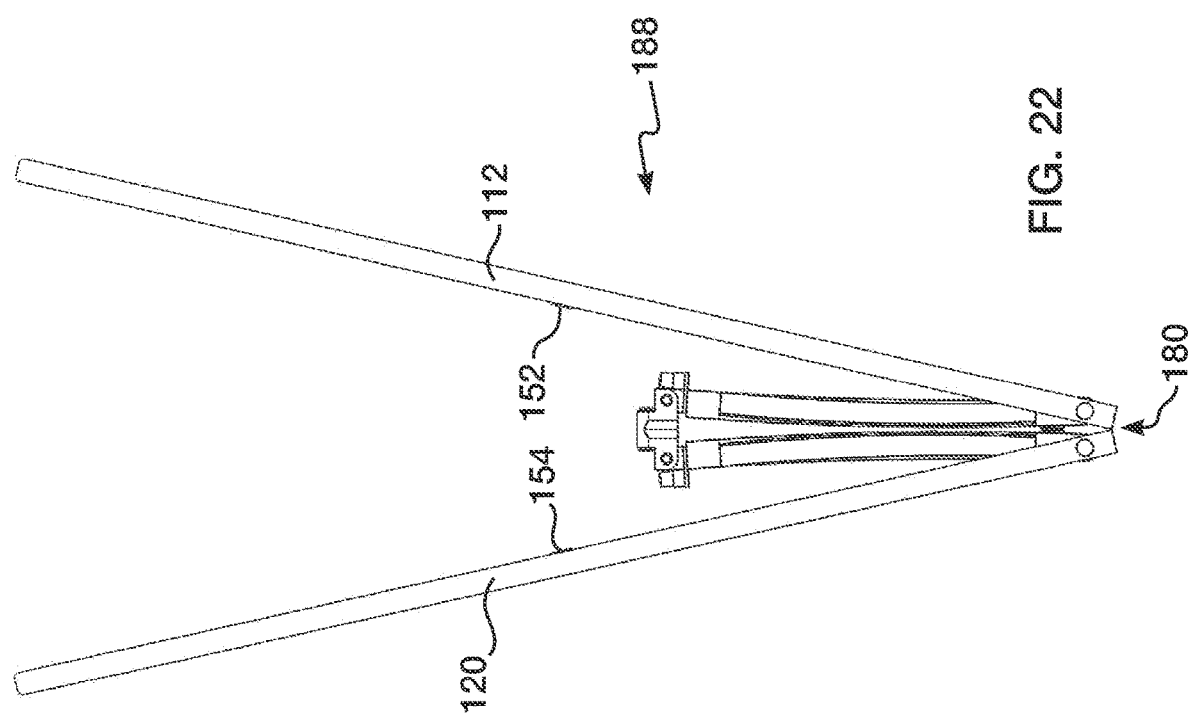
FIG. 22 is a top view of the embodiment in FIG. 21, at the same structural interference configuration.
Figure 23:
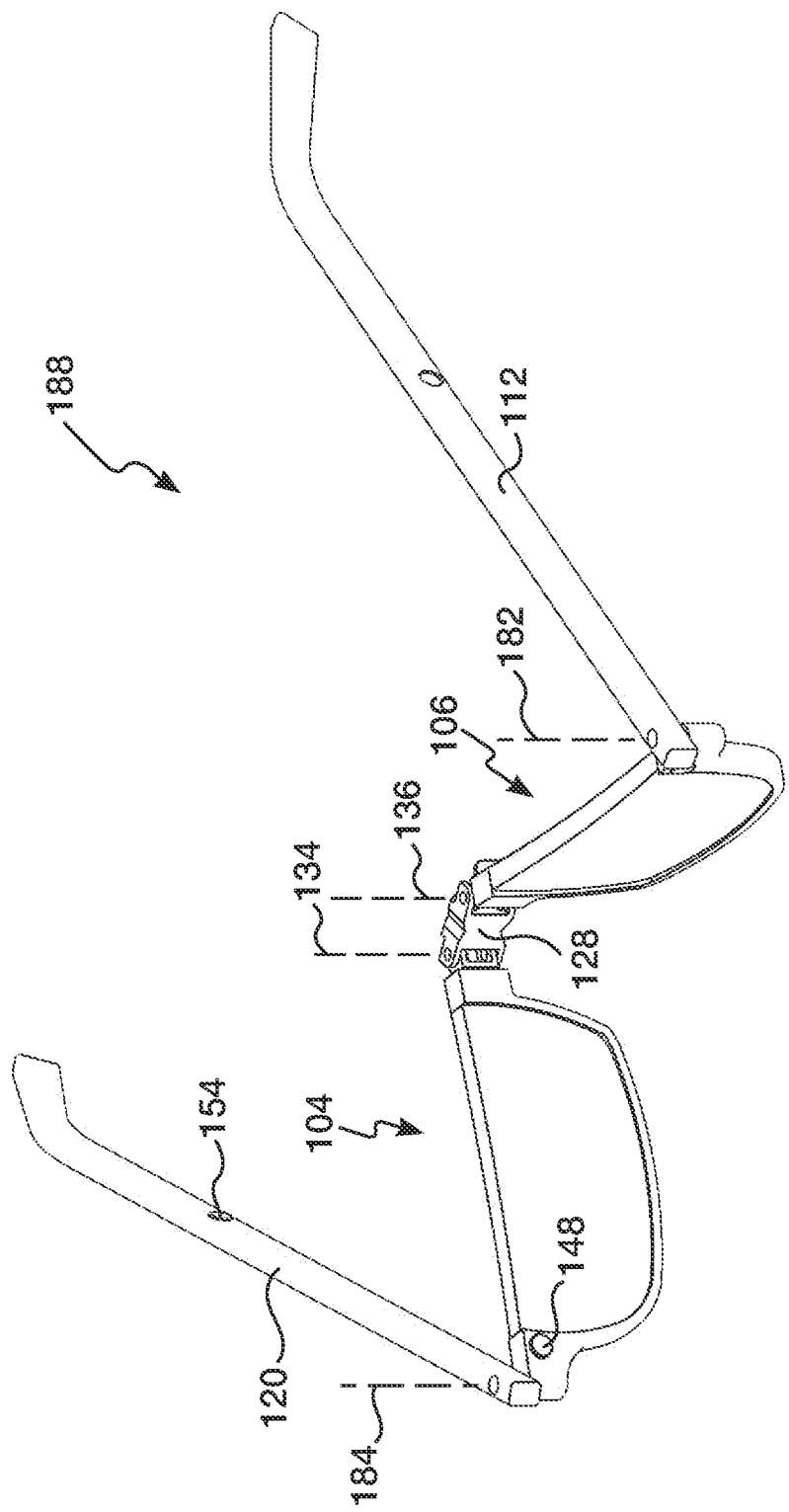
FIG. 23 is a front view in perspective of the embodiment in FIG. 19, at an intermediate configuration.
Figure 24:
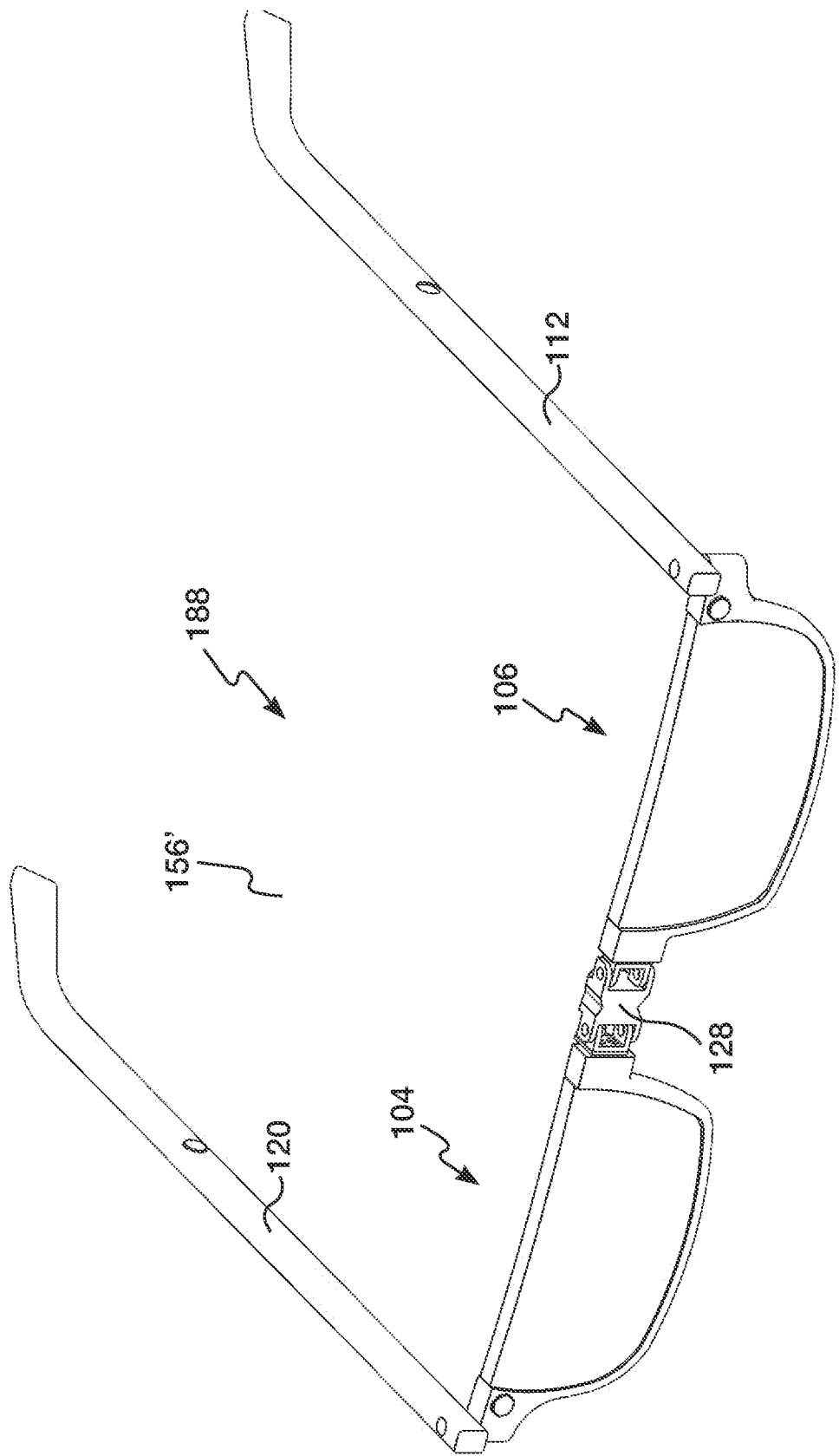
FIG. 24 is a front view in perspective of the embodiment in FIG. 19, at a deployed configuration.
Figure 25:
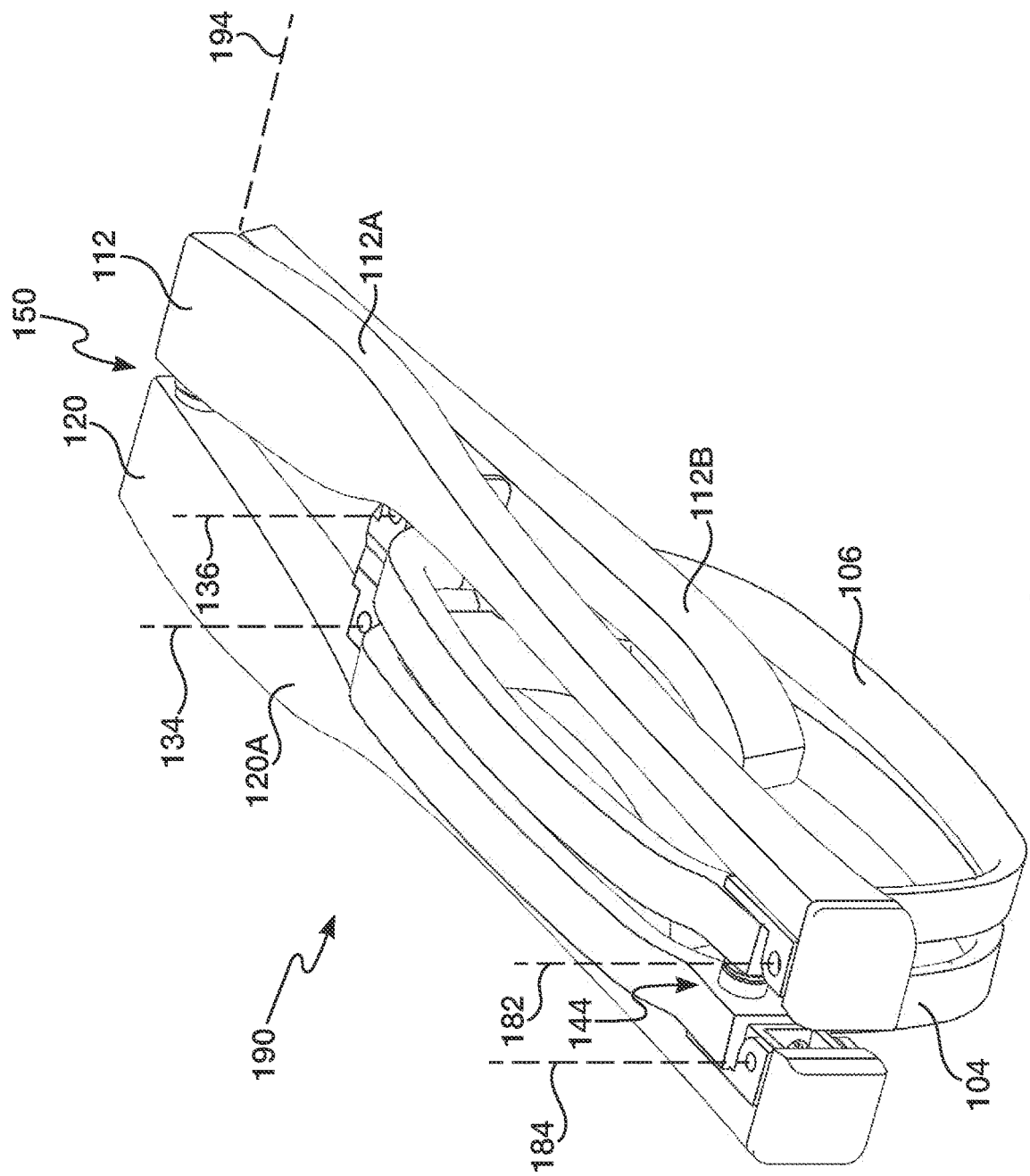
FIG. 25 is a view in perspective of another embodiment structured according to certain principles of the invention, at a stored configuration.
Figure 26:
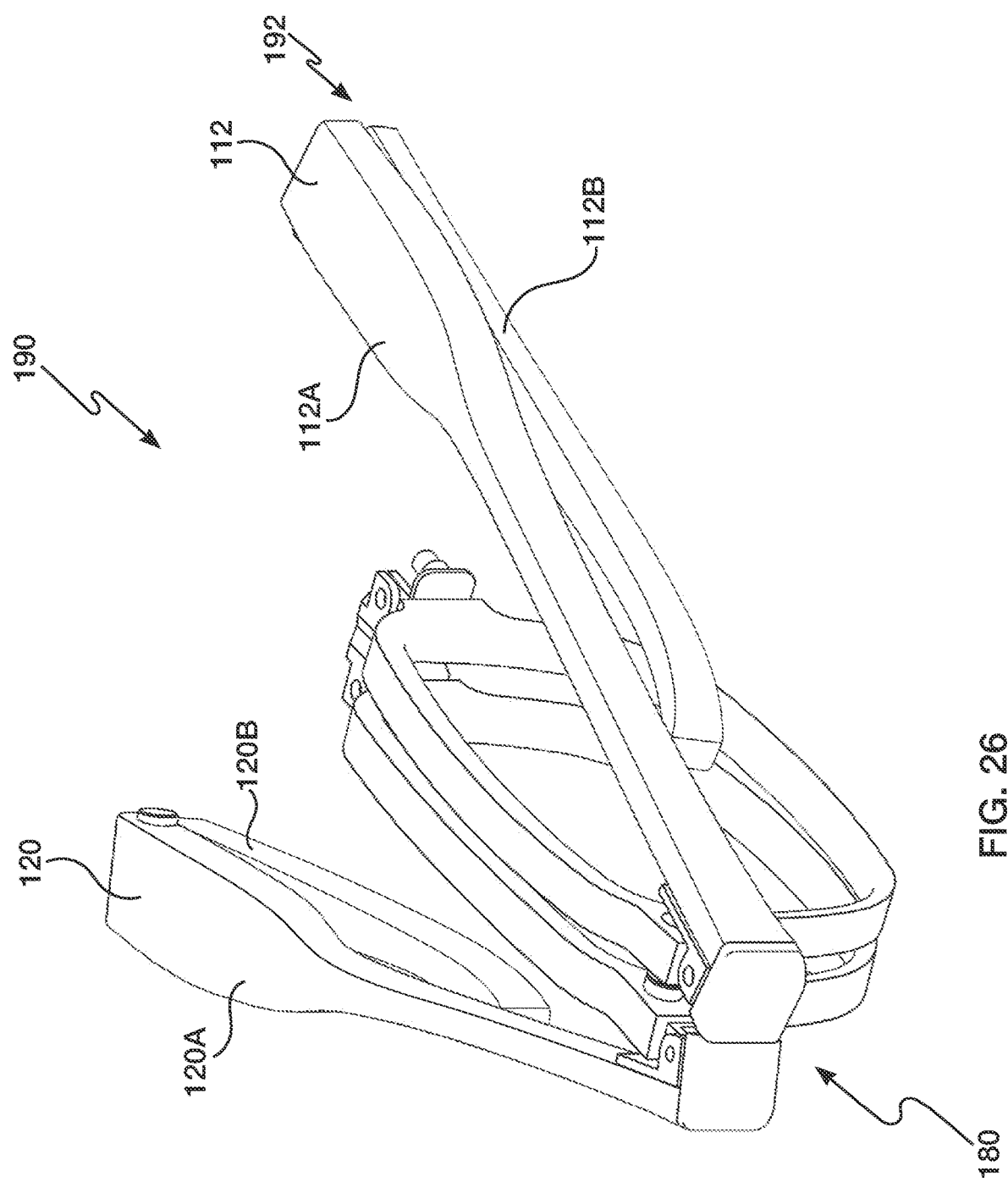
FIG. 26 is a view in perspective of the embodiment in FIG. 25, at a structural interference configuration.

FIGS. 17 and 18 illustrate embodiments in a stored configuration, gripped by a user's hand 172, and ready for the user to deploy to a first configuration. The first configuration may be partially- or fully-deployed. With reference to FIGS. 2 and 18, a gap 174 may be formed between a left temple piece 112 and a right temple piece 120 at the stored configuration. In certain cases, the gap 174 is sized and arranged for penetration there-through by the tip of a second finger when the gripping lever 138 of a temple piece is held between a user's thumb and a first finger. The second finger can then press on the opposite temple piece to urge release of a temple-temple catch. In some cases, the second finger can alternatively press on a frame front half (see e.g., FIG. 18), to urge release of a catch. In other cases, a catch may be released by pinching and slightly rolling the finger and thumb to contact a finger or thumb tip against the opposite temple piece, or against a frame half.

One-handed deployment of a folding frame 100 will now be described with particular reference to FIGS. 1, 3-5, 11, and 17. In FIG. 17, frame 100 is at a stored configuration, and the user's single hand 172 is manipulated to separate the temple-temple catch 150. The spring-biased temple pieces 112, 120 are then urged to freely rotate apart from one another until a structural interference (generally indicated at 180 in FIG. 4), is created by contact between front ends of the left and right temple pieces 112, 120. The structural interference may be characterized as causing a prying force to separate the frame front catch 144. Desirably, a frame is configured and arranged such that separation of catch 144 due to the addition of a prying force applied by left and right temple pieces is inevitable. Subsequent to release of catch 144, the temple pieces continue to rotate about their respective temple hinge pivot axis 182, 184, (see FIG. 5) and frame front haves begin to rotate about their respective temple hinge pivot axis 182, 184, toward a frame-front deployed configuration (e.g., as illustrated in FIG. 1).

It is desirable to provide a user with a frame deployment experience that may be characterized as "smooth". Therefore, component characteristics including rotational moments of inertia, mass, and spring properties are typically selected to operate in harmony to reduce deployment-generated force that is perceived by a user at a gripping lever 138, as well as user-perceived shock generated by components snapping into registration at the first configuration. The counter-balancing forces generated by symmetric deployment may be applied to partially offset user-perceived forces. To that end, it is desirable for the interference 180 (e.g., see FIG. 4) to be created at a temple rotation angle α of less than about 15 degrees. Temple rotation angle α is defined between a frame mid-plane 186 and a temple length axis 188. In certain embodiments, a workable temple rotation angle α may encompass larger values, including 20 degrees, 25 degrees, 30 degrees, or more. Alternative embodiments are operational, even if no interference is ever created.

Symmetric deployment means that as the temple springs are expanding and generating forces, the bridge springs are also expanding, generating cancelling forces. Ideally, this means the net inertia of the whole mechanism is as close to zero as possible, so that the mechanism can deploy while being easily held in the hand (as opposed to having forces that make it want to jump out of your hand). For this to happen properly, the secondary catch 144 should be released relatively early in a deployment procedure. A contravening requirement is that the features at the front of the temple pieces that cause the release of the secondary catch 144 should not be so close that they could accidentally cause this release. In certain preferred embodiments, the interference of the temple pieces occurs when the total angle between them is between 20 and 30 degrees. Desirably, unrestrained motion of a temple piece in a deployment direction inevitably causes a subsequent cascade-release of the frame front catch 144 due to a prying force applied on the catch 144 and caused in part by a structural interference formed between front ends of the left temple piece and the right temple piece at a temple rotation angle α of less than about 15 degrees. Of course, the prying force to separate the catch is augmented by the spring force of the spring associated with cooperating respective temple-front half components.

Spring constants—In an embodiment with dual springs at the bridge, each spring must have approximately 90 degrees of functional travel. (A single spring at the bridge would require 180 degrees of travel, and may be present in an alternative embodiment.) At the fully open position, some residual spring force is needed; it cannot be zero. At the fully closed position, the spring force must be some margin below the holding force of the clasps. This margin may be 1.5× to 2×. That is, a preferred clasp force may be 1.5× to 2× stronger than the spring force pushing against it, so as to prevent accidental deployment of the mechanism. A spring rate of around 1 inch*pound/360 degrees, plus or minus 15 percent, is operable. The fabrication of the spring preferably is such that the maximum number of turns within the available space (which is small) is achieved. This is so the spring force remains close to constant throughout the range of motion. Four to five turns works well in one embodiment.

Clasping force—For both the frame and the temple catches, the main requirement is that they are strong enough to prevent accidental deployment. When the catches are engaged, the spring force is at its maximum. A mechanical catch, which essentially can be switched, will have very high holding forces when engaged, which effectively go to zero when disengaged. So no force balancing analysis need be done when the invention is fabricated with mechanical catches.

Magnetic catches are used in preferred embodiments, as they are very simple to implement. An implementation using Neodymium Ferrite Boron (NdFeB) magnets of medium grade and ⅛" diameter, ⅛" length will provide a clasping force of about 1.5 pounds. When magnetic catches are used, deploying the mechanism requires the user overcoming the clasping force with a pinching and separating motion of the elements containing the cooperating magnets. If the clasping force is too strong, it will be difficult for the user to perform this action. Selection of the magnetic clasping force must therefore be weak enough that the user can easily overcome it when deploying the mechanism, but strong enough to overpower the spring forces so as to prevent accidental deployment.

An embodiment of folding half-glasses structured according to certain principles of the instant invention is indicated generally at 188 in FIGS. 19-24. Similar components disclosed above are indicated by similar numerals in the FIGs., but detailed description is avoided here as being redundant.

An embodiment of folding glasses including optional collapsible temple pieces for more compact storage, and structured according to certain principles of the instant invention, is indicated generally at 190 in FIGS. 25-28. Similar components disclosed above are indicated by similar numerals in the FIGs., and repetitive description is not presented here. Of note, temple pieces 112 and 120 are each made in front and rear parts that fold about their respective temple pivot axis. For example, left temple piece 112 has a front part 112A that folds with respect to rear part 112B at a left temple hinge, generally indicated at 192 (e.g., see FIGS. 25 and 27). In other words, rear part 112B pivots with respect to front part 112A about temple piece 112's pivot axis 194.

Figure 29:
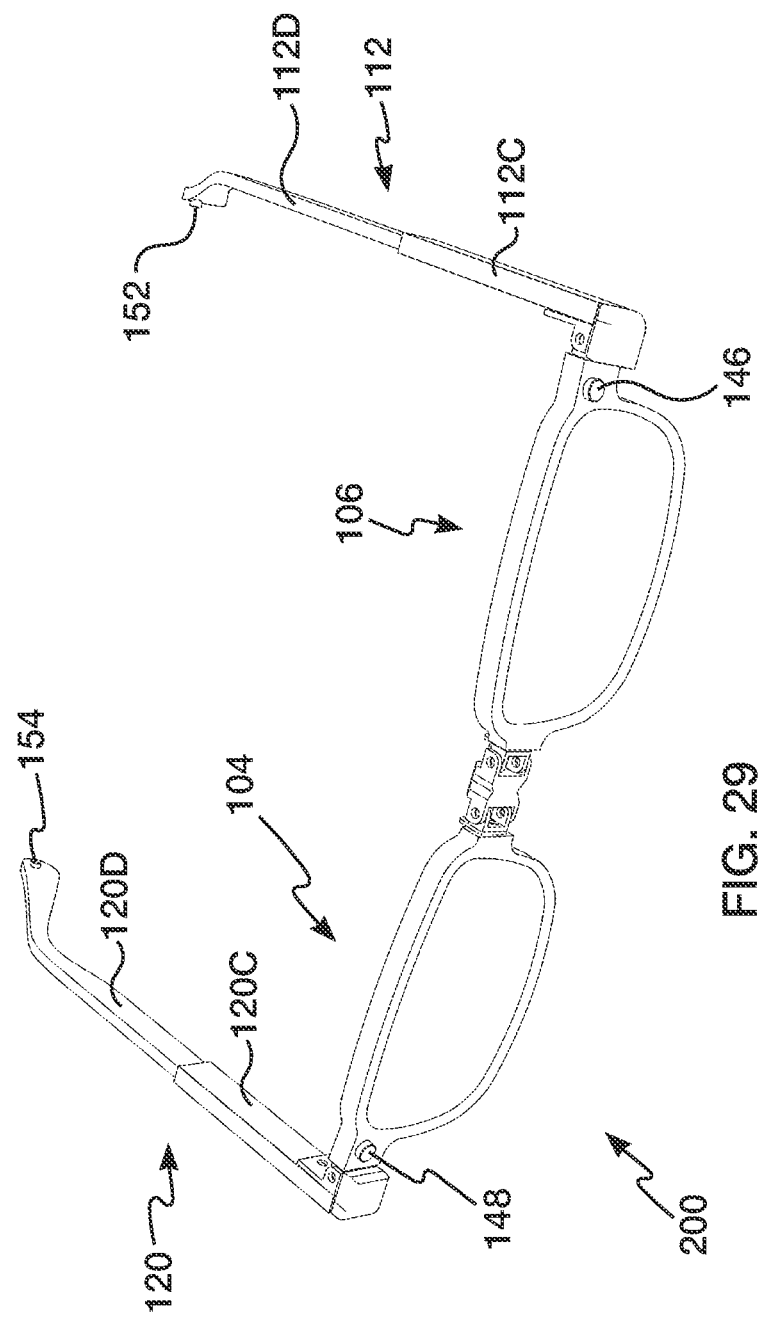
FIG. 29 is a view in perspective of another embodiment structured according to certain principles of the invention, at a deployed configuration.
Figure 30:
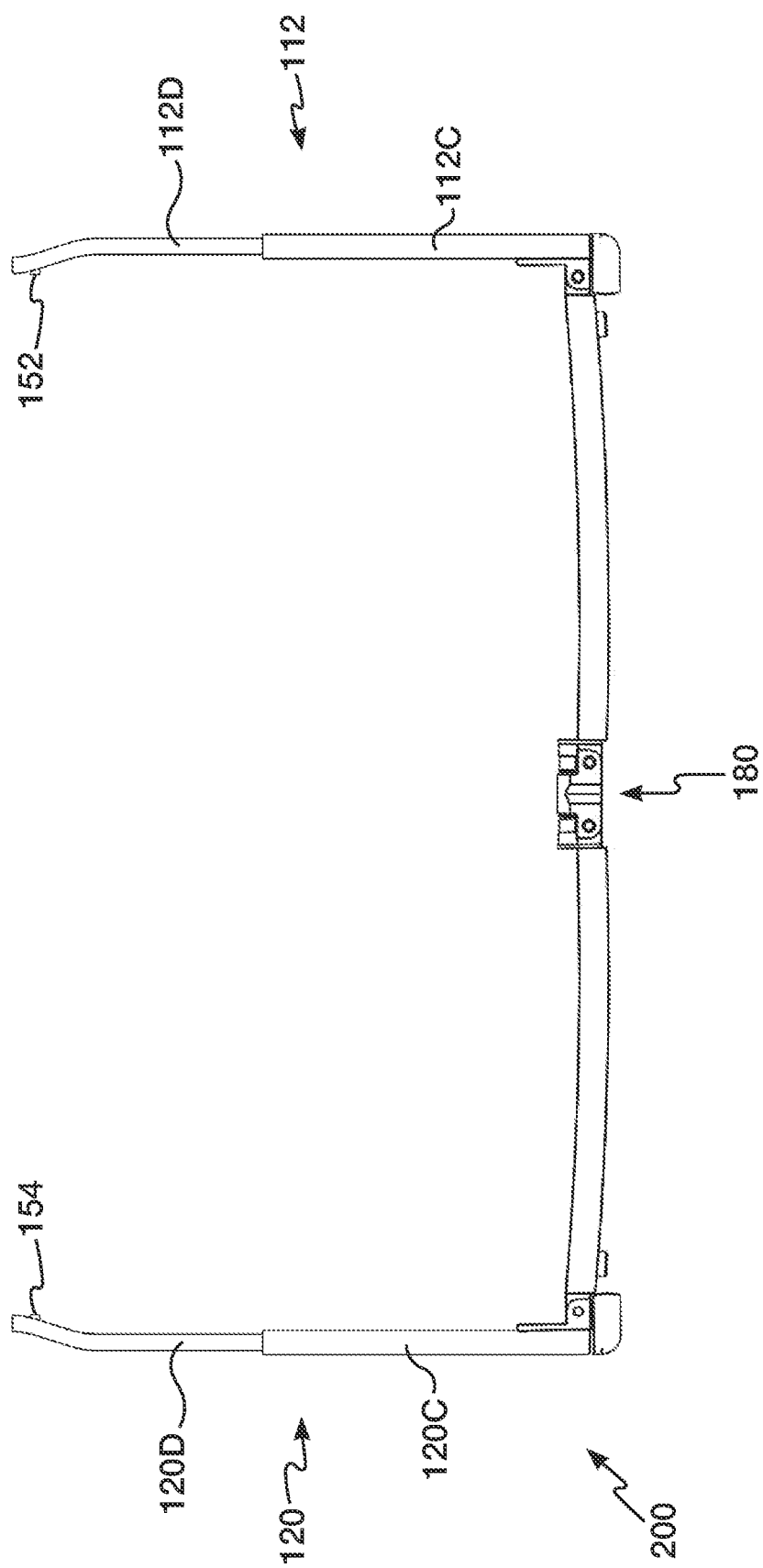
FIG. 30 is a view in perspective of the embodiment in FIG. 29, but at a first configuration.
Figure 31:
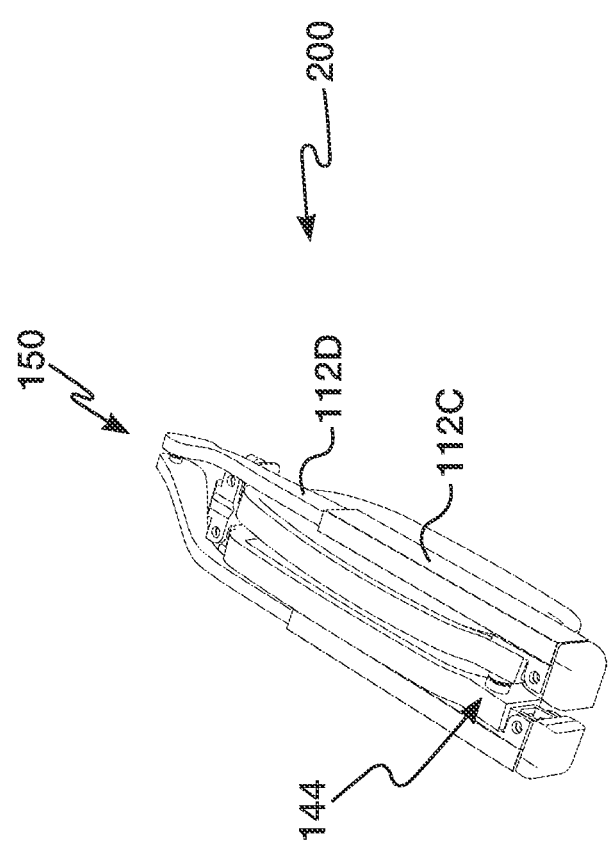
FIG. 31 is a view in perspective of the embodiment in FIG. 29, at a stored configuration.

Another embodiment of folding glasses including collapsible temple pieces for more compact storage, and structured according to certain principles of the instant invention, is indicated generally at 200 in FIGS. 29-30. Similar components disclosed above are indicated by similar numerals in the FIGs., and repetitive description is not presented here. Of note, temple pieces, generally 112 and 120, are each made in front and rear parts that telescopically retract with respect to one another. For example, left temple piece 112 includes front part 112C that forms a housing into which rear part 112D may be collapsed.

Figure 27:
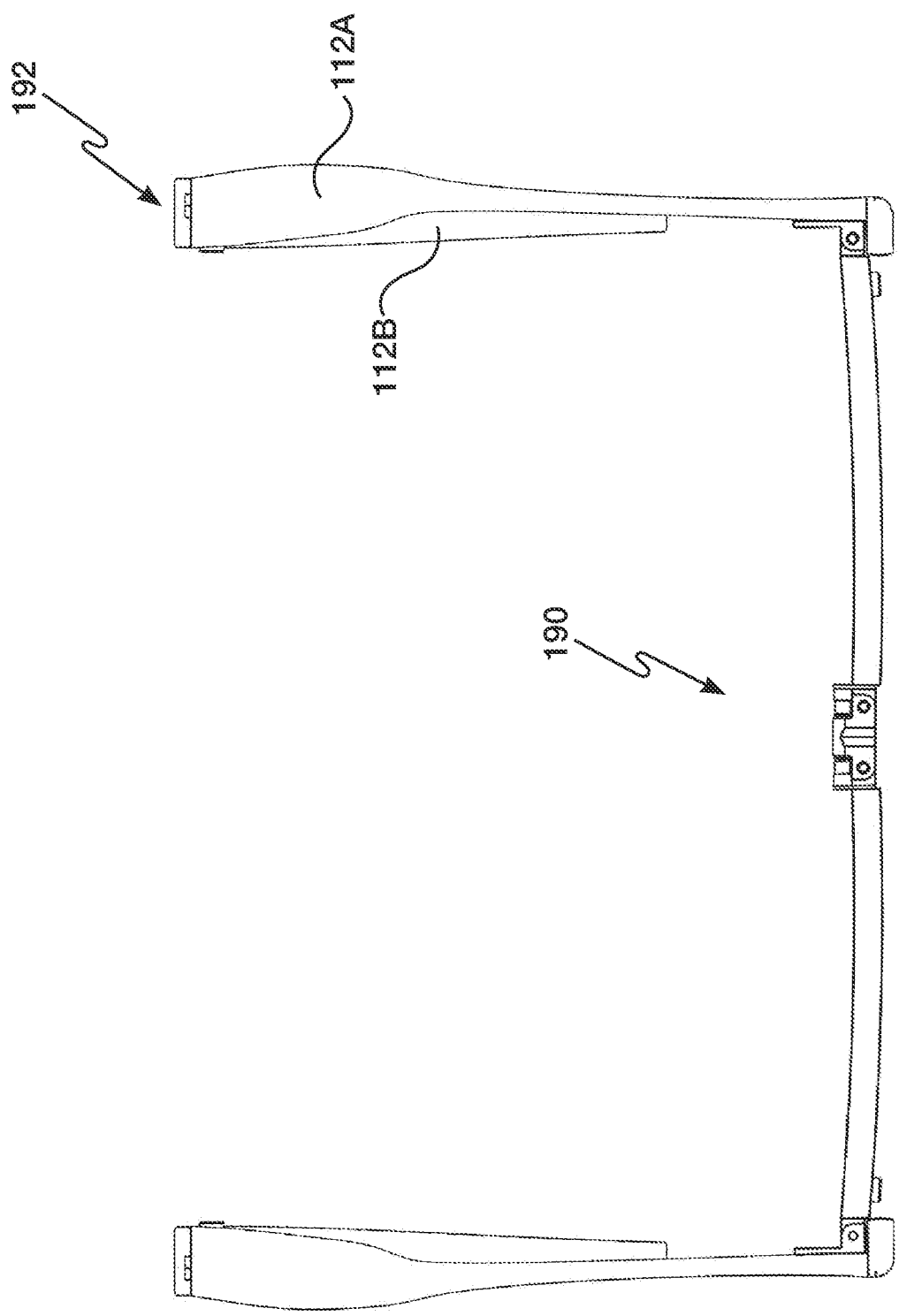
FIG. 27 is a top view of the embodiment in FIG. 25, at a first configuration.
Figure 28:
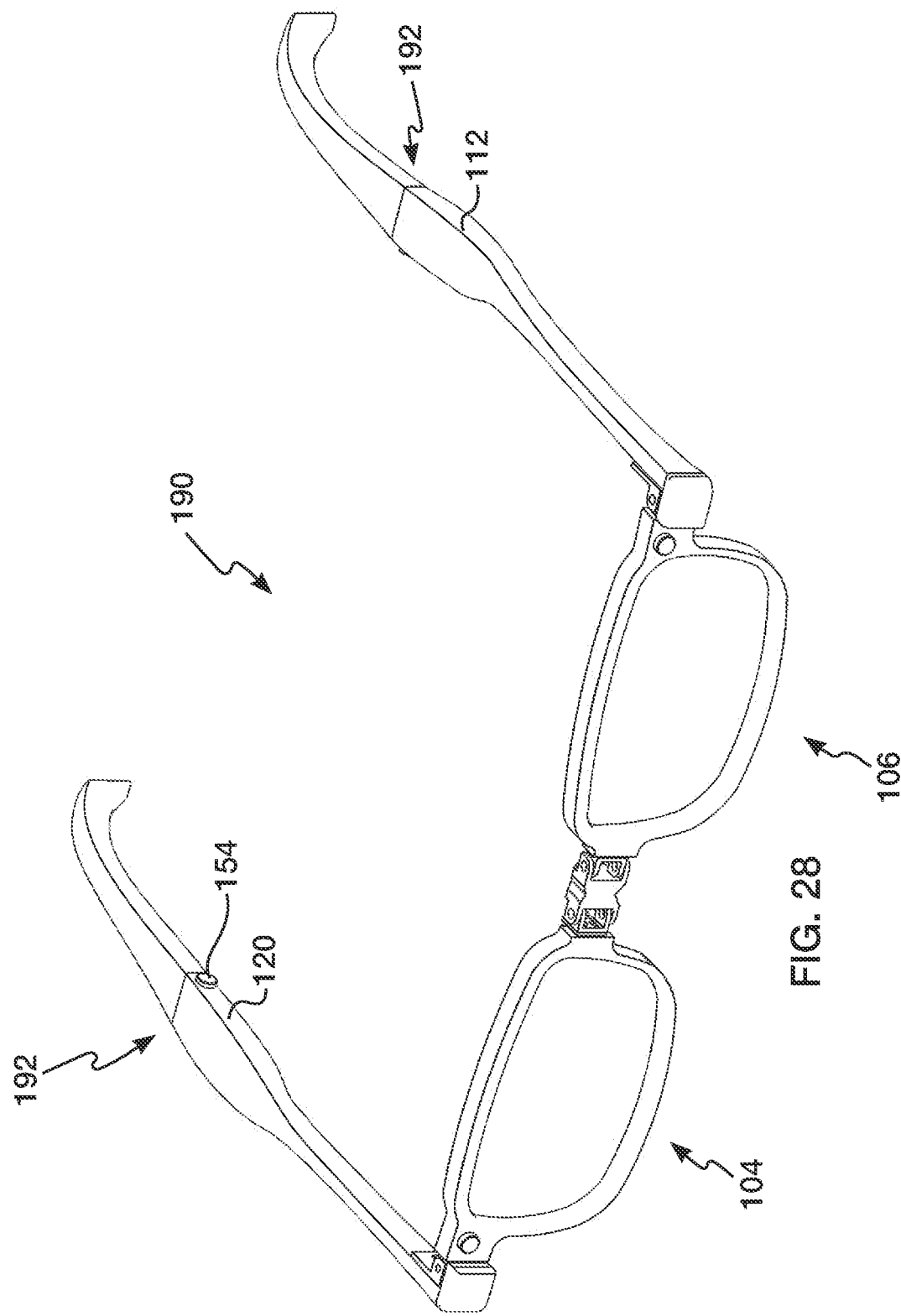
FIG. 28 is a view in perspective of another embodiment structured according to certain principles of the invention, at a deployed configuration.

Each of the embodiments 190, 200 may be deployed in a one-handed operation from a stored configuration to a first configuration. With reference to FIGS. 27 and 30, at the first configuration, the frame front 102 is unfolded to place the left half 106 and the right half 104 in parallel at a deployed frame front configuration, and to place the left temple piece 112 and the right temple piece 120 disposed substantially normal to a plane 110 defined by the deployed frame front 102. A user may then perform subsequent operations as required to fully deploy the temples pieces 112, 120.

While aspects of the invention have been described in particular with reference to certain illustrated embodiments, such is not intended to limit the scope of the invention. The present invention may be embodied in other specific forms without departing from its spirit or essential characteristics. For example, one or more element may be extracted from one described or illustrated embodiment and used separately or in combination with one or more element extracted from one or more other described or illustrated embodiment(s), or in combination with other known structure. The described embodiments are to be considered as illustrative and not restrictive. Obvious changes within the capability of one of ordinary skill are encompassed within the present invention.

What is claimed is:

1. An apparatus, comprising:
a frame front comprising a left half to hold a left optical lens and a right half to hold a right optical lens;
a first hinge disposed in a bridge connecting the left half to the right half and configured to permit folding the frame front from a deployed configuration to a stored configuration resembling a W, such that the left half rotates by about 180 degrees with respect to the right half to dispose the front surface of the left half and the front surface of the right half adjacent to one another with the left half and the right half disposed in parallel at the stored configuration;
a left temple piece extending between a front end and a rear end, the rear end of the left temple piece being configured for association with the left side of a user's head when the apparatus is deployed and disposed at an installed position on the user's head;
a second hinge associated with the front end of the left temple piece to pivotally connect the left temple piece to the left half;
a right temple piece extending between a front end and a rear end, the rear end of the right temple piece being configured for association with the right side of the user's head at the installed position;
a third hinge associated with the front end of the right temple piece to pivotally connect the right temple piece to the right half;
a plurality of biasing elements configured and arranged to urge motion of the apparatus from the stored configuration toward the deployed configuration;
a first catch configured to releaseably hold the left half in a fixed parallel association with respect to the right half at the stored configuration; and
a second catch configured to releaseably hold the left temple piece in a fixed parallel association with the right temple piece at the stored configuration, wherein
the apparatus is configured to permit one-handed deployment from the stored configuration to a first configuration wherein the frame front is unfolded to place the left half and the right half in parallel at a deployed frame front configuration, and to place the left temple piece and the right temple piece disposed substantially normal to a plane defined by the deployed frame front; and
the apparatus is configured such that rotational motion of the left temple piece and the right temple piece, between a fully stored configuration and a fully deployed configuration, is confined to substantially a single plane of action.

2. The apparatus according to claim 1, wherein:
the front end of the left temple piece is structured to contact the front end of the right temple piece during deployment from the stored configuration toward the first configuration, and thereby, to urge release of the first catch.

3. The apparatus according to claim 2, wherein:
a structural interference is created between the front end of the left temple piece and the front end of the right temple piece at a temple rotation angle of less than about 15 degrees, the structural interference causing a prying force to separate the first catch.

4. The apparatus according to claim 1, wherein:
the first hinge comprises a first pivot axis and a second pivot axis, the first pivot axis being disposed approximately in parallel with, and spaced apart from, the second pivot axis; and the plurality of biasing elements comprises:
- a first spring biased to urge rotation of the left half, comprising approximately 90 degrees about the first pivot axis, from the stored configuration toward the first configuration; and
- a second spring biased to urge rotation of the right half, comprising approximately 90 degrees about the second pivot axis, from the stored configuration toward the first configuration.

5. The apparatus according to claim 4, wherein the plurality of biasing elements further comprises:
- a third spring biased to urge relative rotation, of the left temple piece with respect to the left half, comprising approximately 90 degrees about a pivot axis of the second hinge element, from the stored configuration toward the first configuration; and
- a fourth spring biased to urge relative rotation, of the right temple piece with respect to the right half, comprising approximately 90 degrees about a pivot axis of the third hinge, from the stored configuration toward the first configuration.

6. The apparatus according to claim 1, wherein:
at least one of the left temple piece and the right temple piece comprises an enlarged gripping lever disposed spaced apart from its respective front end, the enlarged gripping lever providing a control interface for gripping between a thumb and finger of a user's hand, the gripping lever being wider compared to other areas along a length axis of a temple piece.

7. The apparatus according to claim 1, wherein:
both of the left temple piece and the right temple piece comprise an enlarged gripping lever disposed spaced apart from their respective front end.

8. The apparatus according to claim 6, wherein:
the enlarged gripping lever comprises a top surface and a bottom surface spaced apart by a thickness, the top surface and the bottom surface having a width in excess of about 0.3 inches.

9. The apparatus according to claim 8, wherein:
the width is between about 0.3 inches and about 0.6 inches.

10. The apparatus according to claim 8, wherein:
the thickness is an approximately constant value.

11. The apparatus according to claim 8, wherein:
the thickness is less than the width.

12. The apparatus according to claim 8, wherein:
the top surface is aligned with a temple piece length axis.

13. The apparatus according to claim 8, wherein:
the top surface is disposed in a horizontal orientation at the first configuration.

14. The apparatus according to claim 8, wherein:
the top surface is disposed in a vertical orientation at the first configuration.

15. The apparatus according to claim 1, wherein:
the first catch comprises a pair of magnets disposed to associate cooperating opposite poles for contact together at the stored configuration; and
the second catch comprises a first magnet carried by the left temple piece at a location spaced apart from the front end of the left temple piece, and a second magnet carried by the right temple piece at a location spaced apart from the front end of the right temple piece, the first and second magnets being disposed to associate cooperating opposite poles for contact together at the stored configuration.

16. The apparatus according to claim 1, wherein:
a third catch is disposed to urge the left half and/or the right half toward the first configuration, and to releasably hold the left half and/or right half at a deployed configuration.

17. The apparatus according to claim 16, wherein:
the third catch comprises a pair of magnets disposed to associate cooperating opposite poles for contact together at the fully-deployed configuration.

18. The apparatus according to claim 1, wherein:
subsequent to unfettered release of the apparatus from the stored configuration, the front end of the left temple piece and the front end of the right temple piece are structured and arranged in harmony to cause a structural interference at an opening rotation angle of less than 25 degrees between their respective length axes, the structural interference causing a prying force to open the first catch, the prying force being generated in part by rotational inertia of the left and right temple pieces, whereby the force generated by rotation of frame front left and right sides is consequently counter-balanced by the force generated by counter-rotation of the left and right temple pieces.

19. An apparatus, comprising:
- a frame front comprising a left half to hold a left lens and a right half to hold a right lens;
- a first hinge disposed in a bridge between the left half and the right half to permit folding the frame front from a deployed configuration to a stored configuration such that the left half rotates by about 180 degrees with respect to the right half to dispose the left half and the right half adjacent to one another and approximately in parallel at the stored configuration;
- a left temple piece extending in a length direction between a front end and a rear end, the front end of the left temple piece being pivotally connected through a second hinge to the left half, the rear end of the left temple piece being configured for association with the left side of a user's head when the apparatus is at the deployed configuration and disposed at an installed position on the user's head;
- a right temple piece extending in a length direction between a front end and a rear end, the front end of the right temple piece being pivotally connected through a third hinge to the right half, the rear end of the right temple piece being configured for association with the right side of the user's head at the deployed and installed position;
- an arrangement of biasing elements configured to urge motion of the apparatus from the stored configuration toward the deployed configuration;
- a first catch configured to releaseably hold the left half with respect to the right half at the stored configuration;
- a second catch configured to releaseably hold the left temple piece in association with the right temple piece at the stored configuration, wherein:
the apparatus is structured such that release of the second catch to allow unrestrained motion of a temple piece in a deployment direction inevitably causes a subsequent cascade-release of the first catch due to a prying force applied on the first catch and caused in part by a structural interference formed between front ends of the left temple piece and the right temple piece at a temple rotation angle α of less than about 20 degrees, thereby to cause counter-rotation of temple pieces and frame front halves to balance forces generated by deployment, resulting in a smooth deployment experience for a user.

20. An apparatus, comprising:

a frame front with a left half to hold a left optical lens and a right half to hold a right optical lens;

a first hinge disposed in the frame front between the left half and the right half to permit folding the frame front from a deployed configuration to a stored configuration such that the left half rotates by about 180 degrees with respect to the right half to dispose the left half and the right half adjacent to one another and in parallel at the stored configuration, the first hinge comprising a first torsion spring configured to urge a portion of the frame front toward the deployed configuration;

a left temple piece extending in a length direction between a front end and a rear end, the front end of the left temple piece being pivotally connected through a second hinge to the left half, the second hinge comprising a second torsion spring configured to urge the left temple piece toward the deployed configuration, the rear end of the left temple piece being configured for association with the left side of a user's head when the apparatus is deployed and disposed at an installed position on the user's head;

a right temple piece extending in a length direction between a front end and a rear end, the front end of the right temple piece being pivotally connected through a third hinge to the right half, the third hinge comprising a third torsion spring configured to urge the right temple piece toward the deployed configuration, the rear end of the right temple piece being configured for association with the right side of the user's head at the installed position;

a first catch comprising a pair of magnets disposed to associate cooperating opposite poles for contact together at the stored configuration to releaseably hold the left half in parallel with respect to the right half at the stored configuration; and a second catch comprising a pair of magnets disposed to associate cooperating opposite poles for contact together at the stored configuration to releaseably hold the left temple piece in parallel association with the right temple piece at the stored configuration, wherein:

each of the left temple piece and the right temple piece carry a locally enlarged gripping lever disposed spaced apart from their respective front end, each locally enlarged gripping lever comprising a top surface having a width and being spaced apart from a bottom surface by a thickness, the width being larger than the thickness, each top surface being disposed in a horizontal orientation at the installed configuration.

* * * * *